US011947419B2

(12) United States Patent
Hwang

(10) Patent No.: US 11,947,419 B2
(45) Date of Patent: Apr. 2, 2024

(54) STORAGE DEVICE WITH DATA DEDUPLICATION, OPERATION METHOD OF STORAGE DEVICE, AND OPERATION METHOD OF STORAGE SERVER

(71) Applicant: SAMSUNG ELECTRONICS CO., LTD., Suwon-si (KR)

(72) Inventor: Jooyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/456,821

(22) Filed: Nov. 29, 2021

(65) Prior Publication Data

US 2022/0171676 A1 Jun. 2, 2022

(30) Foreign Application Priority Data

Nov. 30, 2020 (KR) .......................... 10-2020-0164583

(51) Int. Cl.
*G06F 12/1018* (2016.01)
*G06F 3/06* (2006.01)
(Continued)

(52) U.S. Cl.
CPC ........ *G06F 11/1068* (2013.01); *G06F 3/0619* (2013.01); *G06F 3/0622* (2013.01);
(Continued)

(58) Field of Classification Search
CPC .. G06F 11/1068; G06F 3/0619; G06F 3/0622; G06F 3/0659; G06F 3/0679; G06F 11/0772; G06F 12/0238; G06F 12/0253; G06F 3/0608; G06F 3/0641; G06F 3/067; G06F 12/1018; G06F 3/0604; G06F 3/0658; G06F 11/1008; G06F 12/0246
(Continued)

(56) References Cited

U.S. PATENT DOCUMENTS 7,930,559 B1    4/2011   Beaverson et al.
8,738,860 B1 *   5/2014   Griffin ................ G06F 12/0897
                                                                                                                                      711/122

(Continued)

FOREIGN PATENT DOCUMENTS

CN        102567218 A   *   7/2012   ......... G06F 12/0261
KR    10-2018-0138125         12/2018

*Primary Examiner* — Albert Decady
*Assistant Examiner* — Enam Ahmed
(74) *Attorney, Agent, or Firm* — F. Chau & Associates, LLC

(57) ABSTRACT

An operation method of a storage device includes: receiving a write request including an object identifier and data from an external device; performing a hash operation on the data to generate a hash value; determining whether an entry associated with the hash value is empty in a table; storing the data in an area of the storage device corresponding to a physical address and updating the entry to include the physical address and a reference count, when it is determined that the entry is empty; and increasing the reference count included in the entry without performing a store operation associated with the data, when it is determined that the entry is not empty, and an error message is returned to the external device when the entry associated with the hash value is not present in the table.

20 Claims, 24 Drawing Sheets

(51) Int. Cl.
  *G06F 11/07* (2006.01)
  *G06F 11/10* (2006.01)
  *G06F 12/02* (2006.01)

(52) U.S. Cl.
  CPC .......... *G06F 3/0659* (2013.01); *G06F 3/0679* (2013.01); *G06F 11/0772* (2013.01); *G06F 12/0238* (2013.01); *G06F 12/0253* (2013.01)

(58) Field of Classification Search
  USPC ........................................................ 714/764
  See application file for complete search history.

(56) References Cited

U.S. PATENT DOCUMENTS

| | | | |
|---|---|---|---|
| 9,141,554 B1 * | 9/2015 | Candelaria | ............ G06F 3/0641 |
| 10,162,553 B2 | 12/2018 | Sadri | |
| 10,409,518 B1 | 9/2019 | Xie et al. | |
| 10,437,784 B2 | 10/2019 | Chai et al. | |
| 10,725,907 B2 | 7/2020 | Tamura | |
| 10,761,758 B2 | 9/2020 | Doerner et al. | |
| 11,662,951 B2 * | 5/2023 | Ki | ............ G06F 3/0619 |
| | | | 714/764 |
| 2004/0205056 A1 * | 10/2004 | Mori | ............ G06F 7/02 |
| 2014/0281361 A1 | 8/2014 | Park et al. | |
| 2014/0310572 A1 * | 10/2014 | Grube | ................ H04L 63/0428 |
| | | | 714/764 |
| 2015/0212878 A1 * | 7/2015 | Segev | ................ G06F 11/1048 |
| | | | 714/764 |
| 2016/0085628 A1 * | 3/2016 | Hayes | ................ G06F 3/0688 |
| | | | 714/764 |
| 2017/0060744 A1 * | 3/2017 | Saitou | ................ G06F 3/0647 |
| 2018/0067680 A1 | 3/2018 | Ohtsuji | |
| 2018/0364917 A1 | 12/2018 | Ki et al. | |
| 2021/0191880 A1 * | 6/2021 | Ki | ............ G06F 12/1408 |
| 2021/0255791 A1 * | 8/2021 | Shimada | ................ G06F 3/0607 |
| 2023/0305751 A1 * | 9/2023 | Ki | ............ G06F 3/0673 |
| | | | 714/764 |

* cited by examiner

| Hash | Physical Address | Reference Count (RC) |
|---|---|---|
| H1 | PA1 | RC1 |
| H2 | PA2 | RC2 |
| H3 | PA3 | RC3 |
| ⋮ | ⋮ | ⋮ |
| Hn | PAn | RCn |

STORAGE DEVICE WITH DATA DEDUPLICATION, OPERATION METHOD OF STORAGE DEVICE, AND OPERATION METHOD OF STORAGE SERVER

CROSS-REFERENCE TO RELATED APPLICATIONS

This non-provisional patent application claims priority under 35 U.S.C. § 119 to Korean Patent Application No. 10-2020-0164583 filed on Nov. 30, 2020, in the Korean Intellectual Property Office, the disclosure of which is incorporated by reference in its entirety herein.

1. TECHNICAL FIELD

Embodiments of the present disclosure described herein relate to a server system, and more particularly, relate to a storage device with data deduplication, an operation method of the storage device, and an operation method of a storage server.

2. DISCUSSION OF RELATED ART

A server system may include several computing servers connected over a network and provide various services. The server system may include a storage server that stores and manages a large amount of data. Users or objects make reference to specific data in the storage server a number of times. Each reference may result in the creation and storage of duplicate or redundant data within the storage server. As the number of these references increases, the number of times that duplicate data is stored increases. The increase in the number of times that duplicate data is stored causes a decrease in the amount of available storage space of storage devices included in the storage server.

A deduplication technique may be performed to eliminate duplicate or redundant information from within the storage sever. However, current deduplication techniques require a high-capacity memory, thereby increasing manufacturing costs.

SUMMARY

At least one embodiment of the present disclosure provides a storage device supporting a data deduplication function having improved performance with reduced costs, an operation method of the storage device, and an operation method of a storage server.

According to an embodiment, an operation method of a storage device includes: receiving a write request including an object identifier and data from an external device; performing a hash operation on the data to generate a hash value; determining whether an entry associated with the hash value is empty in a table; storing the data in an area of the storage device corresponding to a physical address and updating the entry to include the physical address and a reference count, when it is determined that the entry is empty; and increasing the reference count included in the entry without performing a store operation associated with the data, when it is determined that the entry is not empty, and an error message is returned to the external device when the entry associated with the hash value is not present in the table.

According to an embodiment, an operation method of a storage server including a plurality of storage devices and a storage node configured to manage the plurality of storage devices includes: receiving, at the storage node, a first write request including a first object identifier and first data from an external client server; performing, at the storage node, a hash operation on the first data to generate a first hash value; determining, at the storage node, a first hash range, in which the first hash value is included, from among a plurality of hash ranges respectively assigned to the plurality of storage devices; transmitting, at the storage node, a second write request including the first object identifier, the first data, and the first hash value to a first storage device corresponding to the first hash range from among the plurality of storage devices, performing, at the first storage device, the hash operation on the first data included in the second write request to generate a second hash value; increasing, at the first storage device, a first reference count of a first entry corresponding to the first hash value when the first and second hash values match and the first entry is present in a first table, without a store operation associated with the first data; and transmitting, at the first storage device, a completion response to the storage node.

According to an embodiment, a storage device includes a nonvolatile memory, and a storage controller to control the nonvolatile memory. The storage controller includes a memory that stores a first table, a hash module that performs a hash operation on first data received from an external device to generate a first hash value, and a deduplication manager that searches the first table for a first entry corresponding to the first hash value and selectively stores the first data in the nonvolatile memory based on a search result of the search. When the first entry is present in the first table, the deduplication manager increases a first reference count of the first entry without storing the first data in the nonvolatile memory. When the first entry is absent from the first table, the deduplication manager stores the first data in an area corresponding to a first physical address of the nonvolatile memory and adds the first entry including the first hash value, the first physical address, and the first reference count to the first table.

BRIEF DESCRIPTION OF THE FIGURES

The present disclosure will become apparent by describing in detail embodiments thereof with reference to the accompanying drawings.

FIG. 5 is a diagram for describing a hash-to-physical table managed by a storage device according to an embodiment of the present disclosure.

DETAILED DESCRIPTION OF THE EXEMPLARY EMBODIMENTS

Below, embodiments of the present disclosure are described in detail and clearly to such an extent that one of ordinary skill in the art may implement the present disclosure.

Below, for convenience of description, specific embodiments will be distinguished and described, but the scope of the invention is not limited thereto. For example, it should be understood that various embodiments may be combined or a portion of one embodiment and a portion of another embodiment may be combined.

Figure 1:
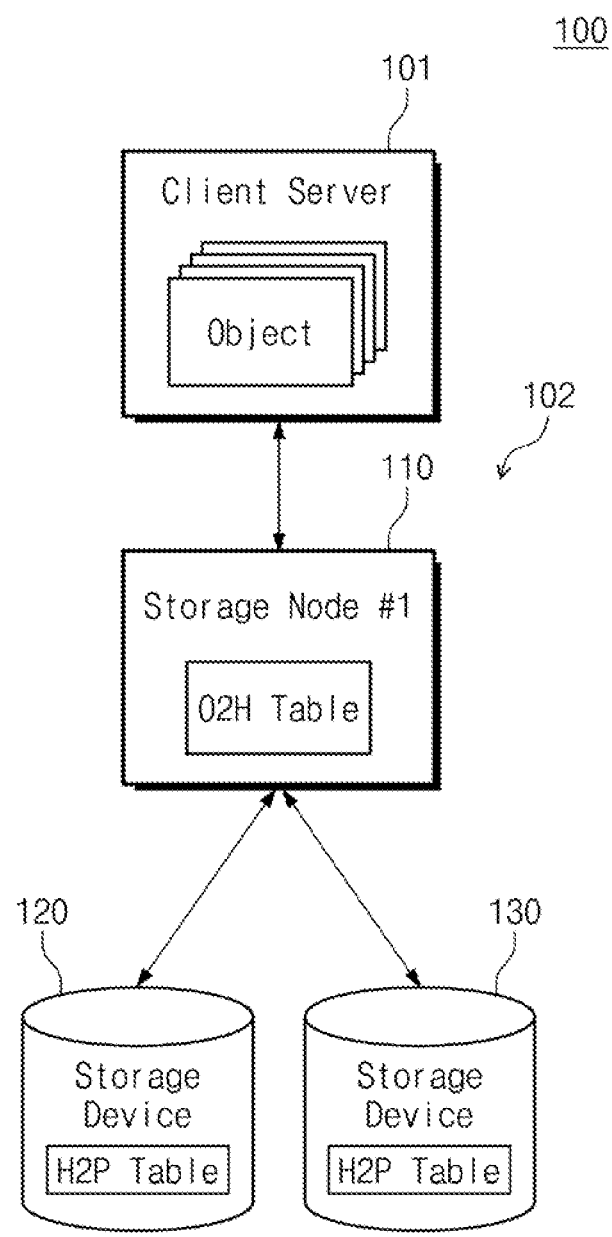
FIG. 1 is a block diagram illustrating a server system according to an embodiment of the present disclosure.

FIG. 1 is a block diagram illustrating a server system according to an embodiment of the present disclosure. Referring to FIG. 1, a server system 100 includes a client server 101 and a storage server 102. The server system 100 may be a data center or a data storage center that performs maintenance on a variety of data and provides various services for the data. The server system 100 may be a system for a search engine or database management or may be a computing system used in various institutions. The server system 100 may be a storage system that provides a cloud service or an on-premise service.

The client server 101 may refer to a user, a terminal of the user, or a computing system of the user, which uses various services with regard to a variety of data. The client server 101 may store data in the storage server 102 or may read data stored in the storage server 102.

Depending on a request of the client server 101, the storage server 102 may store data or may provide the stored data to the client server 101. In an embodiment, the client server 101 and the storage server 102 communicate with each other over a computer network (not illustrated). For example, the computer network could be the Internet. For example, the client server 101 and the storage server 102 may communicate with one another wirelessly or in a wired manner.

The storage server 102 includes a storage node 110 and a plurality of storage devices 120 and 130. The storage node 110 may be configured to manage the storage devices 120 and 130 included in the storage server 102. Under control of the storage node 110, each of the plurality of storage devices 120 and 130 may store data or may output data stored therein. Each of the plurality of storage devices 120 and 130 may include a high-capacity storage medium such as a solid state drive (SSD), but the present disclosure is not limited thereto. The storage node 110 and each of the plurality of storage devices 120 and 130 may communicate with each other through an object-based interface. For example, the object-based interface may refer to an interface, which manages data based on information about an object, which differs from a block-based interface. In an embodiment, the storage node 110 may refer to a server controller included in the storage server 102, but the present disclosure is not limited thereto.

The storage server 102 may provide a deduplication function for data. For example, a plurality of objects may be driven on the client server 101. In an embodiment, an object may indicate information for managing data stored in the storage server 102. For example, one object may refer to one file. In an embodiment, the plurality of objects may be generated on different virtual machines or different applications, and the plurality of objects may respectively correspond to different files or different file groups. In contrast, a part of the plurality of objects may correspond to the same file.

In an embodiment where both a first object and a second object correspond to a second file, the storage server 102 may store a first file corresponding to the first object and the second file corresponding to the second object. Under the above condition, in the case where the first file and the second file are the same, two identical files may be stored, thereby causing a waste of a storage space of the storage server 102. Accordingly, with regard to a plurality of objects corresponding to the same file, the storage server 102 according to an embodiment of the present disclosure may prevent a waste of a storage space by storing only one of the same files respectively corresponding to the plurality of objects. This technical configuration is called a "deduplication function".

The storage node 110 includes an object-to-hash table O2H. The object-to-hash table O2H includes mapping information between information about an object identifier and a hash value. Each of the plurality of storage devices 120 and 130 include a hash-to-physical address table H2P. The hash-to-physical address table H2P may include information of a physical address assigned to a hash value and information about a reference count corresponding to the hash value. The storage server 102 may provide the above deduplication function, based on the object-to-hash table O2H and the hash-to-physical address table H2P described above. The deduplication function according to an embodiment of the present disclosure will be more fully described with reference to drawings below.

Figure 2:
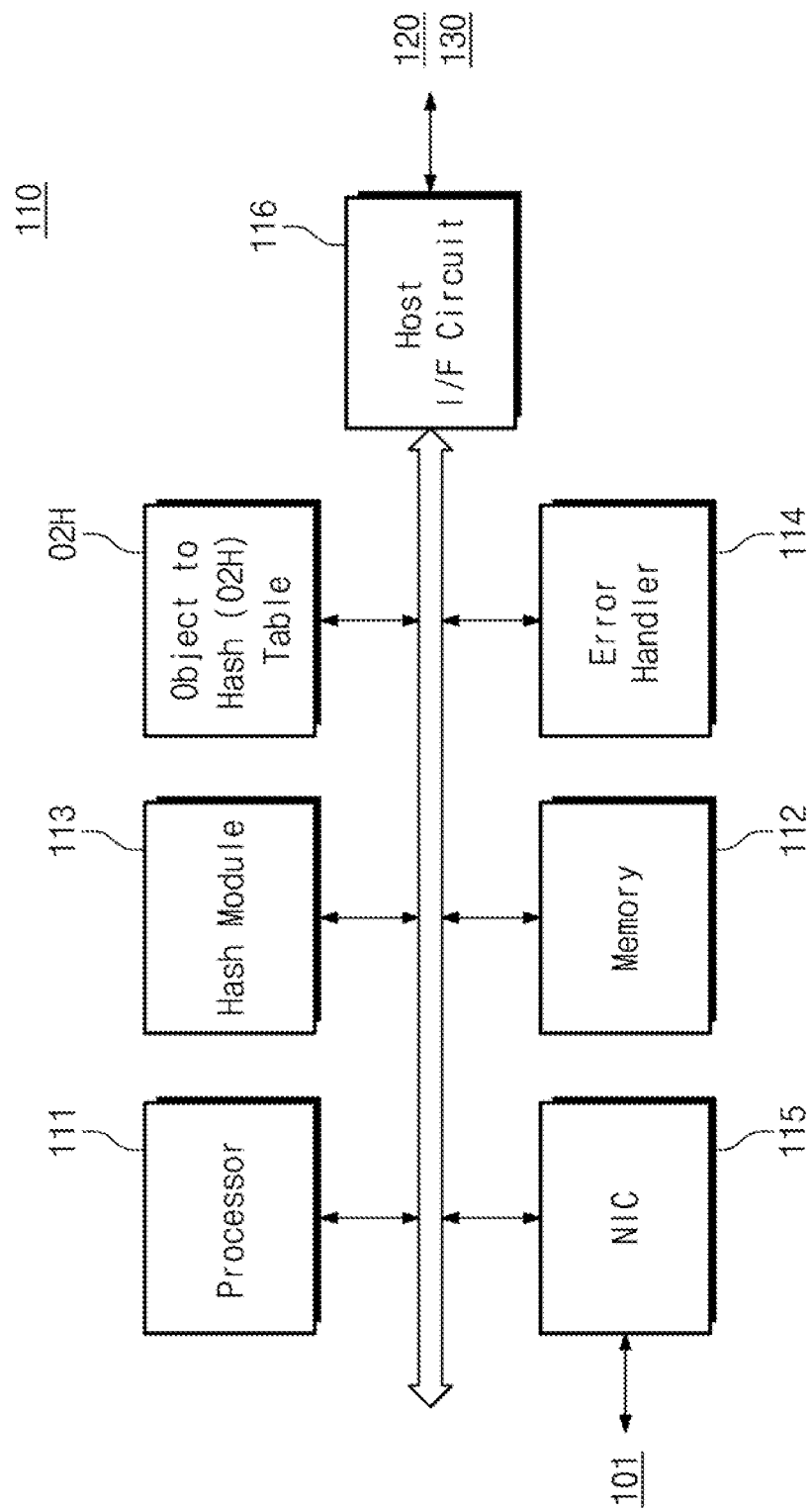
FIG. 2 is a block diagram illustrating a storage node of FIG. 1 according to an embodiment of the present disclosure.

FIG. 2 is a block diagram illustrating a storage node of FIG. 1. Referring to FIGS. 1 and 2, the storage node 110 includes a processor 111, a memory 112, a hash module 113 (e.g., a logic circuit), an error handler 114 (e.g., an error detection and correction circuit), a network interface controller (NIC) 115, a host interface circuit 116, and the object-to-hash table O2H.

The processor 111 may control overall operations of the storage node 110. The memory 112 may be used as a buffer memory, a cache memory, or a working memory of the storage node 110.

The hash module 113 may be configured to perform a hash operation on data to generate a hash value and to output the hash value corresponding to the data. For example, when a write request for first data corresponding to a first object is received from the client server 101, the hash module 113 may perform the hash operation on the first data to output a first hash value. Alternatively, when a write request for second data corresponding to a second object is received from the client server 101, the hash module 113 may perform the hash operation on the second data to output a second hash value. According to an embodiment of the present disclosure, that the first hash value and the second hash value are the same may mean that the first data and the second data are the same. In other words, parameters of the hash operation of the hash module 113 may be set such that the same hash value is generated with respect to the same data.

The error handler 114 may be configured to handle various errors that occur during an operation of the storage node 110. The operation of the error handler 114 will be more fully described with reference to drawings below.

The network interface controller 115 may provide a communication with the client server 101. In an embodiment where the client server 101 and the storage server 102 communicate with each other over an Ethernet network, the network interface controller 115 may be configured to generate or process a TCP/IP protocol-based communication request or communication packet, but the present disclosure is not limited thereto. For example, the network interface controller 115 may operate based on various communication protocols.

The host interface circuit 116 may provide a communication with the plurality of storage devices 120 and 130. In an embodiment, the host interface circuit 116 may communicate with the plurality of storage devices 120 and 130, based on at least one of various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, a CF (Compact Flash) card interface, and a KV (Key-Value) interface.

The object-to-hash table O2H includes mapping information between an object identifier and a hash value. For example, as described above, in the case where a hash value of the first data corresponding to the first object is a first hash value, the object-to-hash table O2H includes mapping information between a first object identifier of the first object and the first hash value. In an embodiment, information that is managed by using the object-to-hash table O2H may be updated in a write operation or an erase operation of the storage server 102. The object-to-hash table O2H may be stored in the memory 112 or a separate external memory. For example, if a new object is being written, a new entry may be created in the object-to-hash table O2H. For example, if an existing object is being deleted, an existing entry for the existing object may be deleted from the object-to-hash table O2H.

Figure 3:
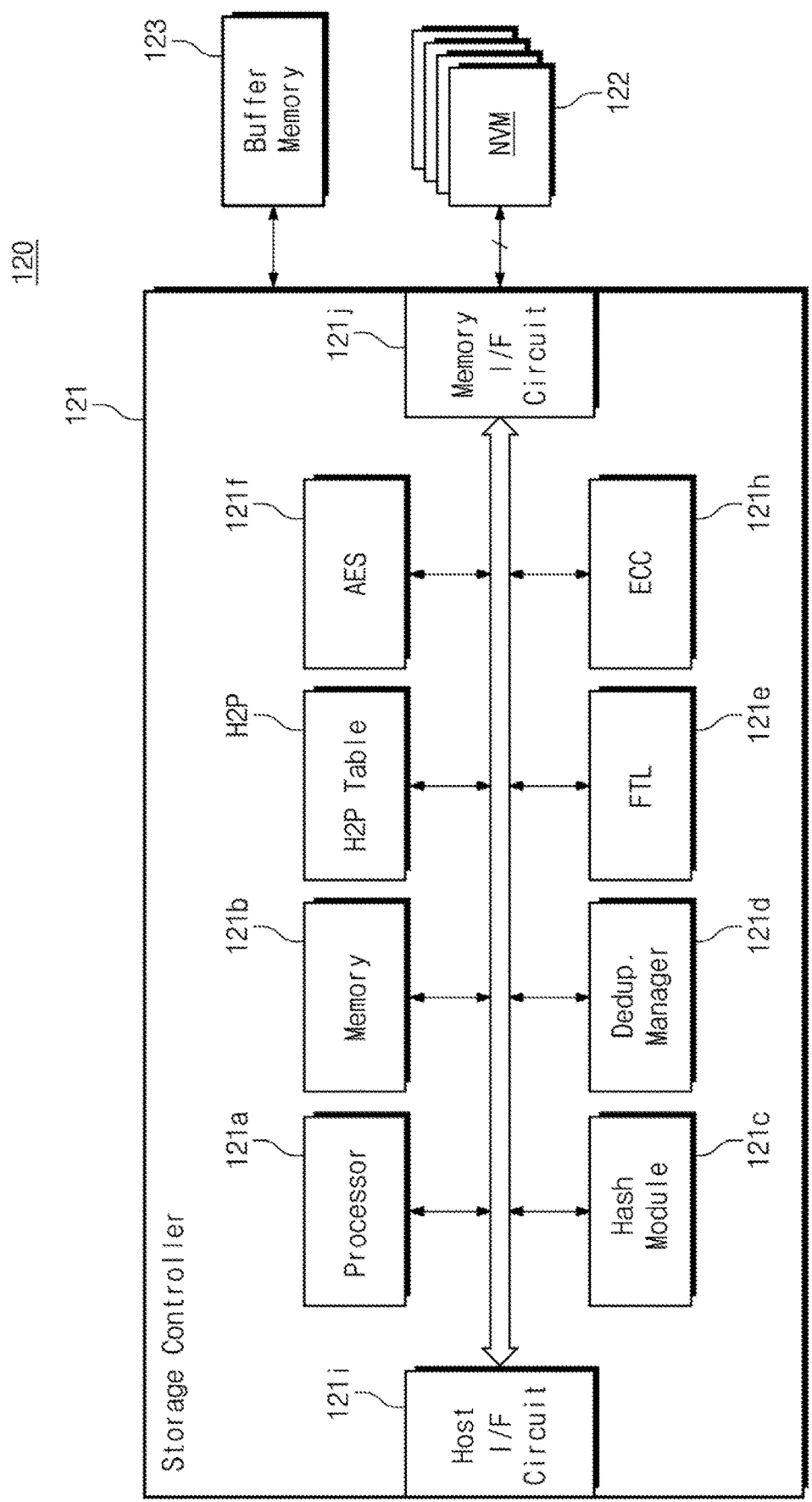
FIG. 3 is a block diagram illustrating one of a plurality of storage devices of FIG. 1 according to an embodiment of the present disclosure.

FIG. 3 is a block diagram illustrating one of a plurality of storage devices of FIG. 1. For convenience of description, one storage device 120 will be described with reference to FIG. 3, but the present disclosure is not limited thereto. For example, the remaining storage devices may also have structures similar to that illustrated in FIG. 3.

Referring to FIGS. 1 and 3, the storage device 120 includes a storage controller 121, nonvolatile memories 122, and a buffer memory 123. In response to a request received from the storage node 110, the storage controller 121 may store data in the nonvolatile memories 122 or may output data stored therein. For example, the request could be a read request or a write request.

The storage controller 121 includes a processor 121a, a memory 121b, a hash module 121c, a deduplication manager 121d, a flash translation layer 121e, an advanced encryption standard (AES) engine 121f, an ECC engine 121h, a host interface circuit 121i, a memory interface circuit 121j, and a hash-to-physical address table H2P (hereinafter referred to as a "hash-to-physical table").

The processor 121a may control overall operations of the storage controller 121. The memory 121b may be used as a buffer memory, a cache memory, or a working memory of the storage controller 121. In an embodiment, the hash module 121c is configured to compute a hash value of data. In an embodiment, the hash module 121c included in the storage controller 121 of FIG. 3 uses the same hash function as the hash module 113 included in the storage node 110 of FIG. 2. That is, hash values that the hash modules 113 and 121c compute with respect to the same data are the same.

The deduplication manager 121d may be configured to perform deduplication on data stored in the storage device 120. For example, the deduplication manager 121d searches for pieces of data, which are referenced by different objects but have the same value, based on the hash-to-physical table H2P, and store only one of the found data in the nonvolatile memories 122. The operation of the deduplication manager 121d will be more fully described with reference to drawings below.

The flash translation layer 121e may perform various maintenance operations for the nonvolatile memories 122. In an embodiment, the maintenance operations for the nonvolatile memories 122 may include a wear-leveling operation, a garbage collection operation, a bad block management operation, etc.

In an embodiment, the flash translation layer 121e according to an embodiment of the present disclosure does not perform a legacy mapping operation between logical addresses and physical addresses.

For example, a physical address at which data are stored may be managed by the hash-to-physical table H2P and the deduplication manager 121d. That is, the deduplication manager 121d may manage a physical address of data based on a hash value being a result of performing the hash operation on data, instead of a logical address of the data. In this case, separate mapping between a logical address and a physical address by the flash translation layer 121e may be unnecessary.

In an embodiment, a hash value according to an embodiment of the present disclosure corresponds to information different from a logical address. For example, a logical address may indicate location information for logically managing a storage space of the storage devices 120 and 130. That is, a logical address is information indicating a logical storage location of data. In contrast, a hash value is a value obtained by performing the hash operation on data itself, not a value indicating a logical storage location of data. In a case where both first data and second data having the same value have different logical storage locations, a logical address of the first data and a logical address of the second data may be different. In contrast, even though both the first data and the second data having the same value have different logical storage locations, hash values being results of performing the hash operation on the first data and the second data are the same. That is, a hash value that is used in the present disclosure corresponds to information having a characteristic different from that of a logical address.

The AES engine 121f may perform at least one of an encryption operation and a decryption operation on data input to the storage controller 121 by using a symmetric-key algorithm.

The ECC engine 121h may perform an error detection and correction function on read data read out from the nonvolatile memories 122. For example, the ECC engine 121h may generate parity bits of write data to be stored in the nonvolatile memories 122, and the parity bits thus generated may be stored in the nonvolatile memories 122 together with the write data. Upon reading data from the nonvolatile memories 122, the ECC engine 121h may correct an error of the read data by using parity bits read from the nonvolatile memories 122 together with the read data and may output error-corrected read data.

The host interface circuit 121i may communicate with the storage node 110. In an embodiment, the host interface circuit 121i may be implemented based on at least one of protocols for the following interfaces: an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, a CF (Compact Flash) card interface, and a KV (Key-Value) interface.

The memory interface circuit 121j may provide a communication with the plurality of nonvolatile memories 122. The memory interface circuit 121j may operate based on at least one of protocols for the following interfaces: a toggle interface and an open NAND flash interface (ONFI).

The buffer memory 123 may be configured to store a variety of information necessary for the storage device 120 to operate. For example, the buffer memory 123 may store information about the hash-to-physical table H2P. Alternatively, the buffer memory 123 may be configured to store software components such as the deduplication manager 121d and the flash translation layer 121e. The software components stored in the buffer memory 123 may be loaded onto the memory 121b and may be executed by the processor 121a.

Figure 4:
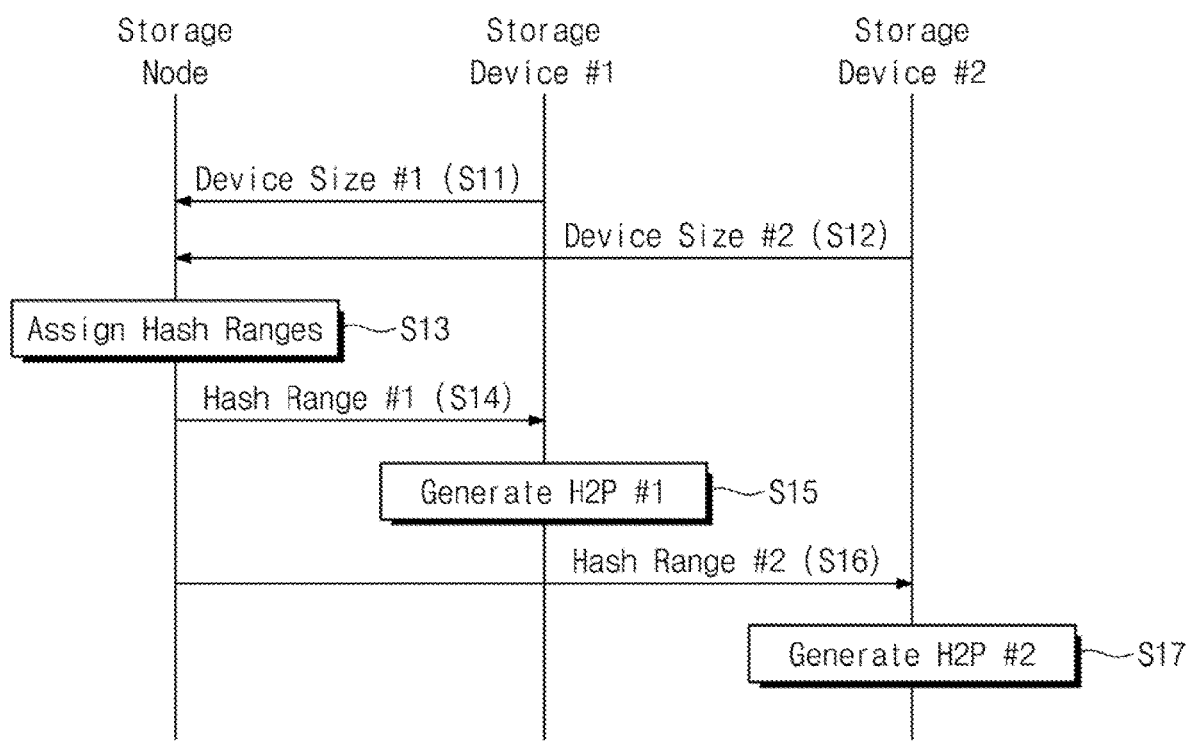
FIG. 4 is a flowchart illustrating an operation of a storage server of FIG. 1 according to an embodiment of the present disclosure.

FIG. 4 is a flowchart illustrating an operation of a storage server of FIG. 1 according to an embodiment of the disclosure. Referring to FIGS. 1 and 4, in operation S11, the storage node 110 receives information about a first device size from the first storage device 120. The information about the first device size may refer to information about an available storage space of the first storage device 120. In operation S12, the storage node 110 receives information about a second device size from the second storage device 130. The information about the second device size may refer to information about an available storage space of the second storage device 130.

In operation S13, the storage node 110 assigns hash ranges to the first and second storage devices 120 and 130, respectively. For example, the storage node 110 may assign a first hash range having a range corresponding to the first device size information to the first storage device 120 and may assign a second hash range having a range corresponding to the second device size information to the second storage device 130.

In operation S14, the storage node 110 transmits information about the first hash range to the first storage device 120. In operation S15, the first storage device 120 generates a first hash-to-physical table based on the first hash range information.

In operation S16, the storage node 110 transmits information about the second hash range to the second storage device 130. In operation S17, the second storage device 130 generates a second hash-to-physical table based on the second hash range information.

In an embodiment, the first hash range and the second hash range do not overlap each other. That is, the storage node 110 may manage data such that data having a hash value included in the first hash range is stored in the first storage device 120 and data having a hash value included in the second hash range is stored in the second storage device 130.

In an embodiment, a hash value according to the present disclosure corresponds to information having a characteristic different from that of a logical address as described above, and thus, additional description will be omitted to avoid redundancy.

FIG. 5 is a diagram for describing a hash-to-physical table managed by a storage device. Below, for convenience of description, embodiments of the present disclosure will be described with reference to the communication between the storage node 110 and the first storage device 120. However, the present disclosure is not limited thereto. Referring to FIGS. 1 and 5, the hash-to-physical table H2P includes mapping information between a plurality of hash values H1 to Hn and a plurality of physical addresses PA1 to PAn and information about reference counts RC1-RCn corresponding to the plurality of hash values H1 to Hn.

For example, in the case where a hash value of first data is the first hash value H1, the first data may be stored in an area corresponding to the first physical address PAL In this case, the first reference count RC1 may indicate the number of objects that make reference to the first data corresponding to the first hash value H1. That is, that the first reference count RC1 is "a" may mean that the number of objects making reference to the first data corresponding to the first hash value H1 or the first data stored in the area of the first physical address PA1 is "a".

In an embodiment, in the case where data corresponding to a hash value is not stored, an entry of the hash-to-physical table H2P, which corresponds to the hash value, may be empty. For example, in the case where data corresponding to the third hash value H3 is not yet stored in the storage device 120, an entry corresponding to the third hash value H3 may be empty.

In an embodiment, in the case where the hash-to-physical table H2P illustrated in FIG. 5 is managed by the first storage device 120, the plurality of hash values H1 to Hn included in the hash-to-physical table H2P may be included in the first hash range assigned by the storage node 110.

Figure 6:
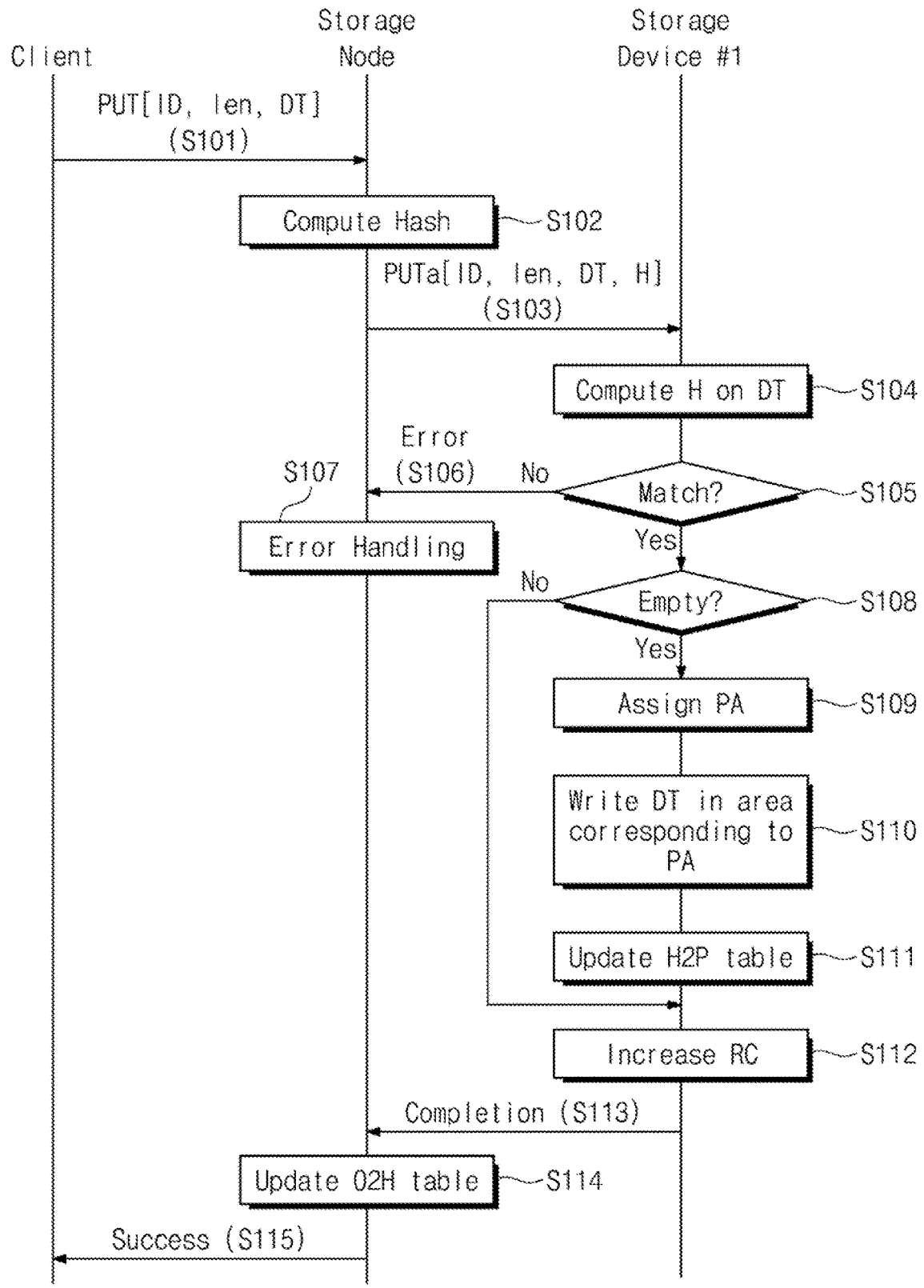
FIG. 6 is a flowchart illustrating an operation of a server system of FIG. 1 according to an embodiment of the present disclosure.

FIG. 6 is a flowchart illustrating an operation of a server system of FIG. 1 according to an embodiment of the disclosure. Embodiments of the present disclosure will be described with reference to the client server 101, the storage node 110, and the first storage device 120 of the server system 100 for ease of discussion. However, the present disclosure is not limited thereto. In an embodiment, an operation (i.e., a write operation) in which data from a specific object is stored in a storage device will be described with reference to FIG. 6.

Referring to FIGS. 1 and 6, in operation S101, the client server 101 transmits a write request to the storage server 102. In an embodiment, the write request may be a write request PUT including an object identifier ID, a data length len, and data DT.

In operation S102, the storage node 110 computes a hash value. For example, the storage node 110 may compute a hash value "H" by performing the hash operation on the data DT received from the client server 101. In an embodiment, the hash operation of the storage node 110 may be performed by the hash module 113 described with reference to FIG. 2.

In operation S103, the storage node 110 transfers the write request to the first storage device 120. In an embodiment, the write request transferred to the first storage device 120 may be a write request PUTa including an object identifier ID, a data length len, data DT, and a hash value "H".

In an embodiment, even though not illustrated, the storage node 110 may select a storage device, to which the write request is to be transferred, based on the computed hash value "H". For example, as described with reference to FIG. 4, the storage node 110 may assign a hash range to each of the plurality of storage devices 120 and 130. The storage node 110 may transfer the write request to a storage device corresponding to a hash range in which the computed hash value "H" is included. For example, in the case where the hash value "H" is included in the first hash range assigned to the first storage device 120, the write request may be transferred to the first storage device 120; in the case where the hash value "H" is included in the second hash range assigned to the second storage device 130, the write request may be transferred to the second storage device 130.

In operation S104, the first storage device 120 computes a hash value "H" by performing the hash operation on the received data DT. In an embodiment, the hash operation of the first storage device 120 may be performed by the hash module 121c described with reference to FIG. 3.

In operation S105, the first storage device 120 compares the computed hash value "H" and the received hash value "H". That the computed hash value "H" and the received hash value "H" are different may mean that an error is included in the received information. In the case where the computed hash value "H" and the received hash value "H" are different, in operation S106, the first storage device 120 may return error information to the storage node 110.

In operation S107, the storage node 110 perform error handling. In an embodiment, the error handling in operation S107 includes an operation of again performing the hash operation on the data DT, an operation of again transmitting a write request (e.g., PUTa[ID, len, DT, H]) to the first storage device 120, etc. Alternatively, the error handling may include an operation of returning the error information to the client server 101. The above error handling may be performed by the error handler 114 described with reference to FIG. 2 by way of example, but the present disclosure is not limited thereto.

When the computed hash value "H" and the received hash value "H" match, in operation S108, the first storage device 120 determines whether an entry of the hash-to-physical table H2P, which corresponds to the received hash value "H", is empty.

That the entry of the hash-to-physical table H2P corresponding to the received hash value "H" is empty may mean that the data DT corresponding to the received hash value "H" is not stored in the first storage device 120. In the case where the entry of the hash-to-physical table H2P corresponding to the received hash value "H" is empty, in operation S109, the first storage device 120 assigns a physical address PA. For example, the assignment of the physical address PA may include assigning a physical address to the hash value. In operation S110, the first storage device 120 writes the data DT in an area (i.e., a storage area of the nonvolatile memories 122) corresponding to the assigned physical address PA. In operation S111, the first storage device 120 updates the hash-to-physical table H2P. In operation S112, the first storage device 120 increases a relevant reference count RC.

For example, as described above, because that an entry corresponding to the received hash value "H" is empty means that the data DT corresponding to the received hash value "H" is not stored in the first storage device 120, the data DT is stored in the nonvolatile memories 122. Accordingly, the first storage device 120 may assign the physical address PA and may store the data DT in an area corresponding to the assigned physical address PA. Afterwards, the first storage device 120 may update the hash-to-physical table H2P such that a physical address corresponding to the received hash value "H" is set to the assigned physical address. For example, an entry of the hash-to-physical table H2P associated with the received hash value "H" may be updated to the assigned physical address. Afterwards, because the number of objects making reference to the data DT corresponding to the hash value "H" is "1", the reference count RC corresponding to the hash value "H" may increase as much as "1". For example, if the entry was initially empty, its reference count RC may be increased from 0 to 1.

That the entry of the hash-to-physical table H2P corresponding to the received hash value "H" is not empty may mean that the data DT corresponding to the received hash value "H" is already stored in the first storage device 120. In the case where the entry of the hash-to-physical table H2P corresponding to the received hash value "H" is not empty, the first storage device 120 may omit operation S109 to operation S111. That is, because the data DT corresponding to the received hash value "H" are already stored in the nonvolatile memories 122, the first storage device 120 may omit an operation of storing the data DT. That is, deduplication associated with the data DT may be performed.

In the case where the entry of the hash-to-physical table H2P corresponding to the received hash value "H" is not empty, operation S112 is performed. For example, that the data DT corresponding to the received hash value "H" is already stored may mean that an additional object makes reference to the data DT already stored. Accordingly, the first storage device 120 may increase the reference count RC.

In operation S113, the first storage device 120 transmits completion information to the storage node 110. The completion information may indicate to the storage node 110 that writing of the data has completed.

In operation S114, the storage node 110 updates the object-to-hash table O2H. For example, the storage node 110 may update the object-to-hash table O2H based on mapping information between the object identifier ID received in operation S101 and the hash value "H". In an embodiment, which hash value corresponds to an object identifier may be determined based on the object-to-hash table O2H, and this operation may be used in a read operation.

In operation S115, the storage node 110 may transmit success information to the client server 101. The success information may indicate whether the write completed successfully.

Figure 7:
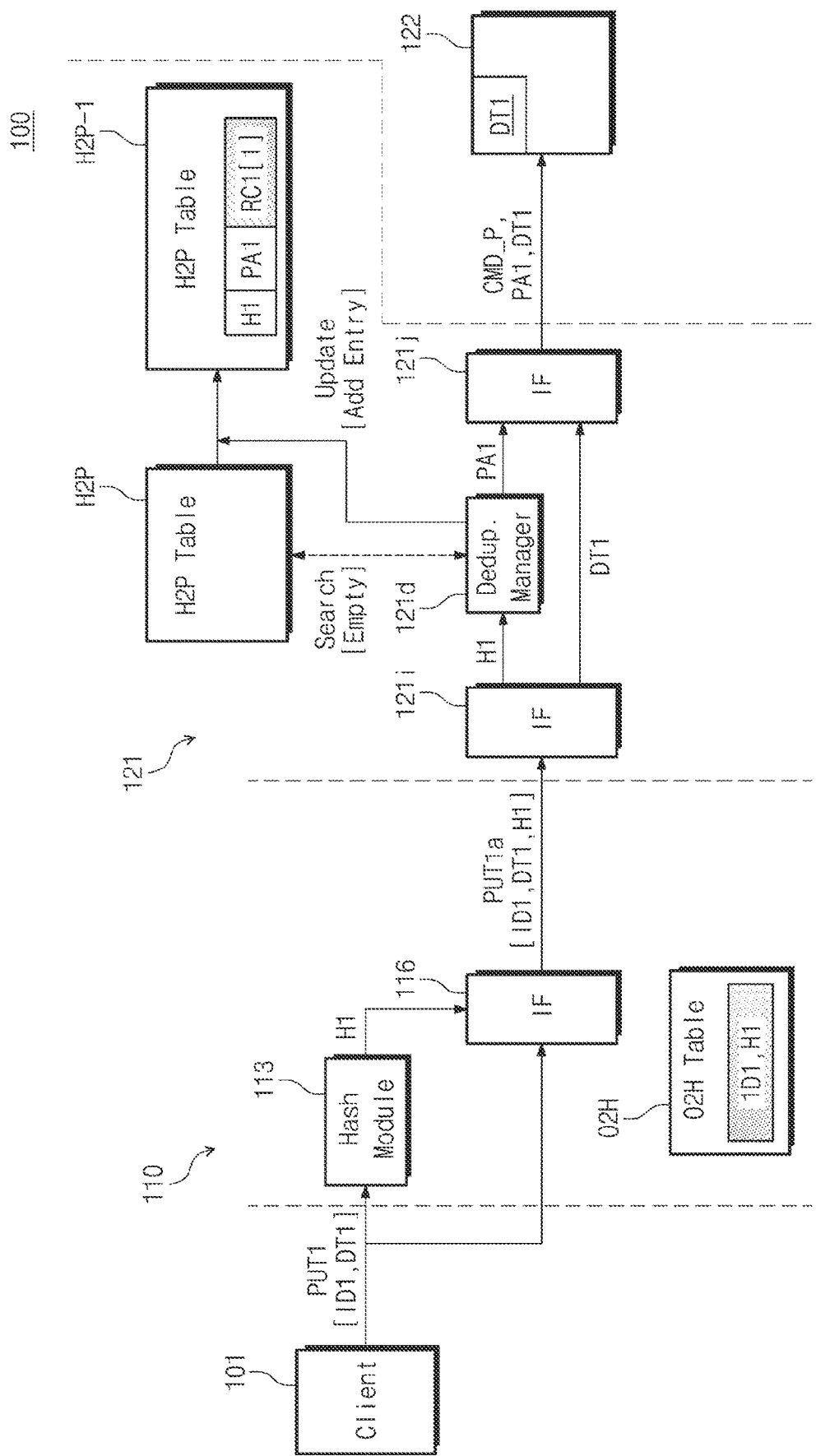
FIGS. 7 and 8 are diagrams for describing operations according to the flowchart of FIG. 6.
Figure 8:
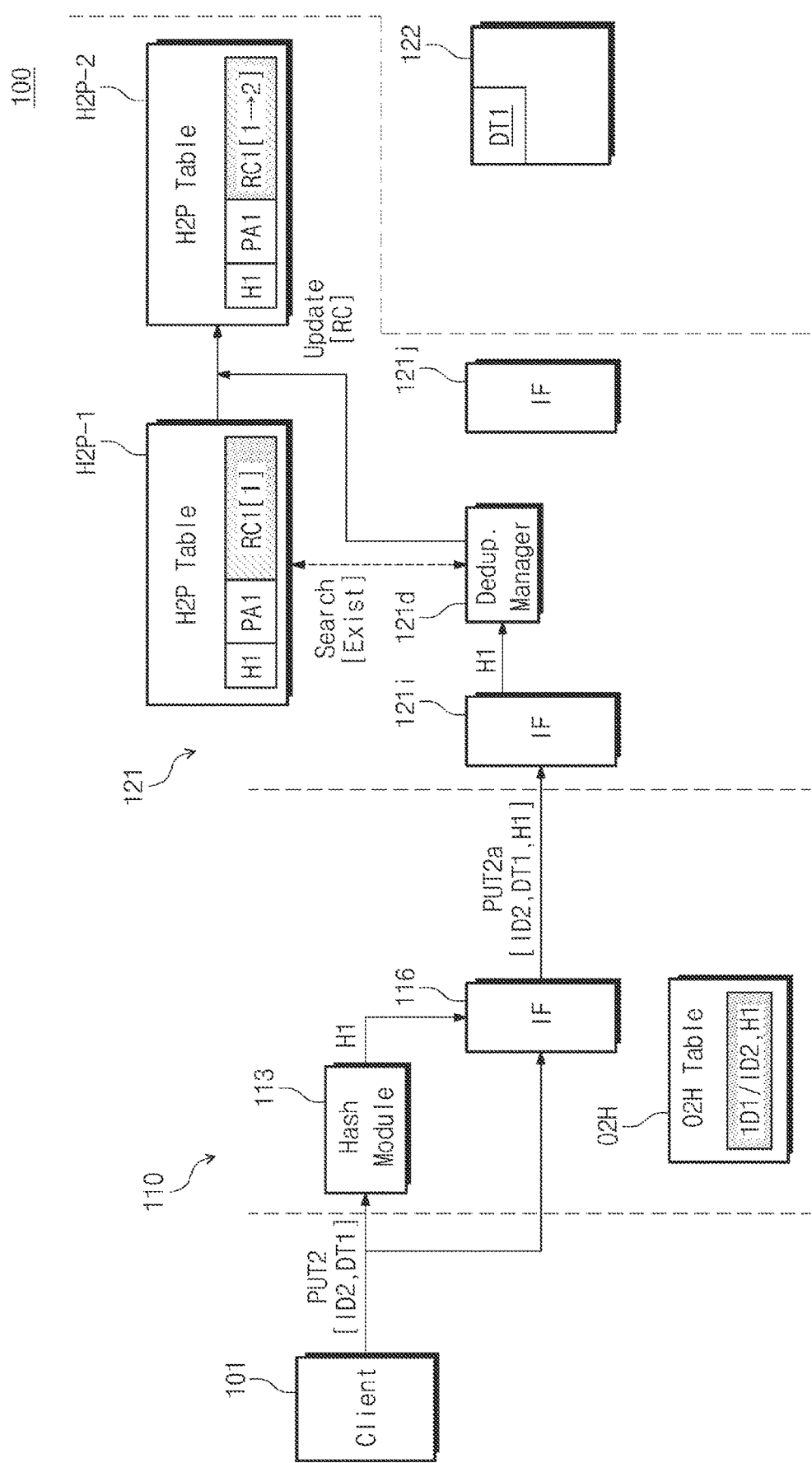

FIGS. 7 and 8 are diagrams for describing operations according to the flowchart of FIG. 6. Below, for brevity of drawing and for convenience of description, components that are unnecessary to describe a write operation according to the flowchart of FIG. 6 are omitted. In an embodiment, for brevity of drawing and for convenience of description, components associated with operation S104 and operation S105 of FIG. 6 (i.e., error detection for a received request) are omitted. However, the present disclosure is not limited thereto.

Referring to FIGS. 1, 6, and 7, the client server 101 transmits a first write request PUT1 to the storage node 110. The first write request PUT1 may be a write request for first data DT1 that an object corresponding to a first object identifier ID1 makes reference to, and may include information about the first object identifier ID1 and the first data DT1.

The hash module 113 of the storage node 110 computes the first hash value H1 by performing the hash operation on the first data DT thus received. The host interface circuit 116 of the storage node 110 transmits a first write request PUT1$a$ including the first hash value H1 to the first storage device 120. The first write request PUT1$a$ may additionally include the first data DT and the first object identifier ID1.

In an embodiment, as described above, the storage node 110 may select a storage device corresponding to a hash range in which the first hash value H1 is included, based on the first hash value H1 and hash ranges respectively assigned to the plurality of storage devices 120 and 130. The storage node 110 may transmit the first write request PUT1$a$ including the first hash value H1 to the selected storage device.

The host interface circuit 121$i$ of the first storage device 120 may receive the first write request PUT1$a$ including the first hash value H1. The deduplication manager 121$d$ of the first storage device 120 may search the hash-to-physical table H2P for the first hash value H1. In the embodiment of FIG. 7, in the hash-to-physical table H2P, an entry corresponding to the first hash value H1 may be empty. In this case, the deduplication manager 121$d$ may assign a first physical address PAL In an embodiment, an operation of assigning a physical address may be performed by the flash translation layer (FTL) 121$e$ (refer to FIG. 3).

The memory interface circuit 121$j$ of the first storage device 120 may transmit a program command CMD_P, the first physical address PA1, and the first data DT1 to at least one of the plurality of nonvolatile memories 122. The first physical address PA1 may correspond to the assigned physical address. The at least one of the plurality of nonvolatile memories 122 may store the first data DT1 in an area corresponding to the first physical address PA1 in response to the program command CMD_P.

The deduplication manager 121$d$ may update the hash-to-physical table H2P based on the first hash value H1 and the first physical address PAL For example, as illustrated in FIG. 7, the deduplication manager 121$d$ may update the hash-to-physical table H2P to a first hash-to-physical table H2P-1 by adding an entry, which includes mapping information between the first hash value H1 and the first physical address PA1 and a first reference count RC1, to the hash-to-physical table H2P.

In an embodiment, the storage node 110 may update the object-to-hash table O2H. For example, the storage node 110 may add mapping information between the first object identifier ID1 and the first hash value H1 to the object-to-hash table O2H. For example, after an entry including the first hash value H1 is added to the hash-to-physical table H2P, an entry may be added to the object-to-hash table O2H including the first object identifier ID1 and the first hash value H1.

Referring to FIGS. 1, 6, and 8, the client server 101 transmits a second write request PUT2 to the storage node 110. The second write request PUT2 may be a write request for the first data DT1 that an object corresponding to a second object identifier ID2 that makes reference to, and may include information about the second object identifier ID2 and the first data DT1.

The hash module 113 of the storage node 110 computes the first hash value H1 by performing the hash operation on the first data DT1 thus received. In an embodiment, the first data DT1 corresponding to the first object identifier ID1 may be the same as the first data DT1 corresponding to the first object identifier ID1 described with reference to FIG. 7. That is, the objects respectively corresponding to the first and second object identifiers ID1 and ID2 may make reference to the same data, that is, the first data DT1. In this case, the hash value computed by the hash module 113 is the same as the first hash value H1. The host interface circuit 116 of the storage node 110 transmits a second write request PUT2$a$ including the first hash value H1 to the first storage device 120.

The host interface circuit 121$i$ of the first storage device 120 receives the second write request PUT2$a$ including the first hash value H1. The deduplication manager 121$d$ searches the first hash-to-physical table H2P-1 based on the first hash value H1 thus received. For example, the first hash-to-physical table H2P-1 may include a mapping relationship between the first hash value H1 and the first physical address PA1 and the first reference count RC1, as described with reference to FIG. 7.

In this case, the deduplication manager 121$d$ determines that an entry corresponding to the first hash value H1 exists and then generates a second hash-to-physical table H2P-2 by updating the first hash-to-physical table H2P-1 without an operation of storing, programming, or writing the first data DT1. For example, the deduplication manager 121$d$ may generate the second hash-to-physical table H2P-2 by increasing the first reference count RC1 of the entry corresponding to the first hash value H1 by "1", in the first hash-to-physical table H2P-1. In the embodiment of FIG. 8, the first reference count RC1 may be updated to "2", and this means that the first data DT1 associated with the first hash value H1 is referenced by two objects (e.g., objects corresponding to the first and second object identifiers ID1 and ID2).

That is, as described with reference to FIG. 8, the first storage device 120 may perform or omit the following operation: storing received data in the nonvolatile memories 122 based on the hash-to-physical table H2P.

In an embodiment, the storage node 110 may update the object-to-hash table O2H based on mapping information between the second object identifier ID2 and the first hash value H1.

As described above, according to embodiments of the present disclosure, the storage server 102 may manage data based on a hash value of the data DT. In this case, even though a plurality of objects make reference to the same data, only one data is stored in the storage server 102. Accordingly, the utilization of a storage space of nonvolatile memories or a storage device may be improved.

Figure 9:
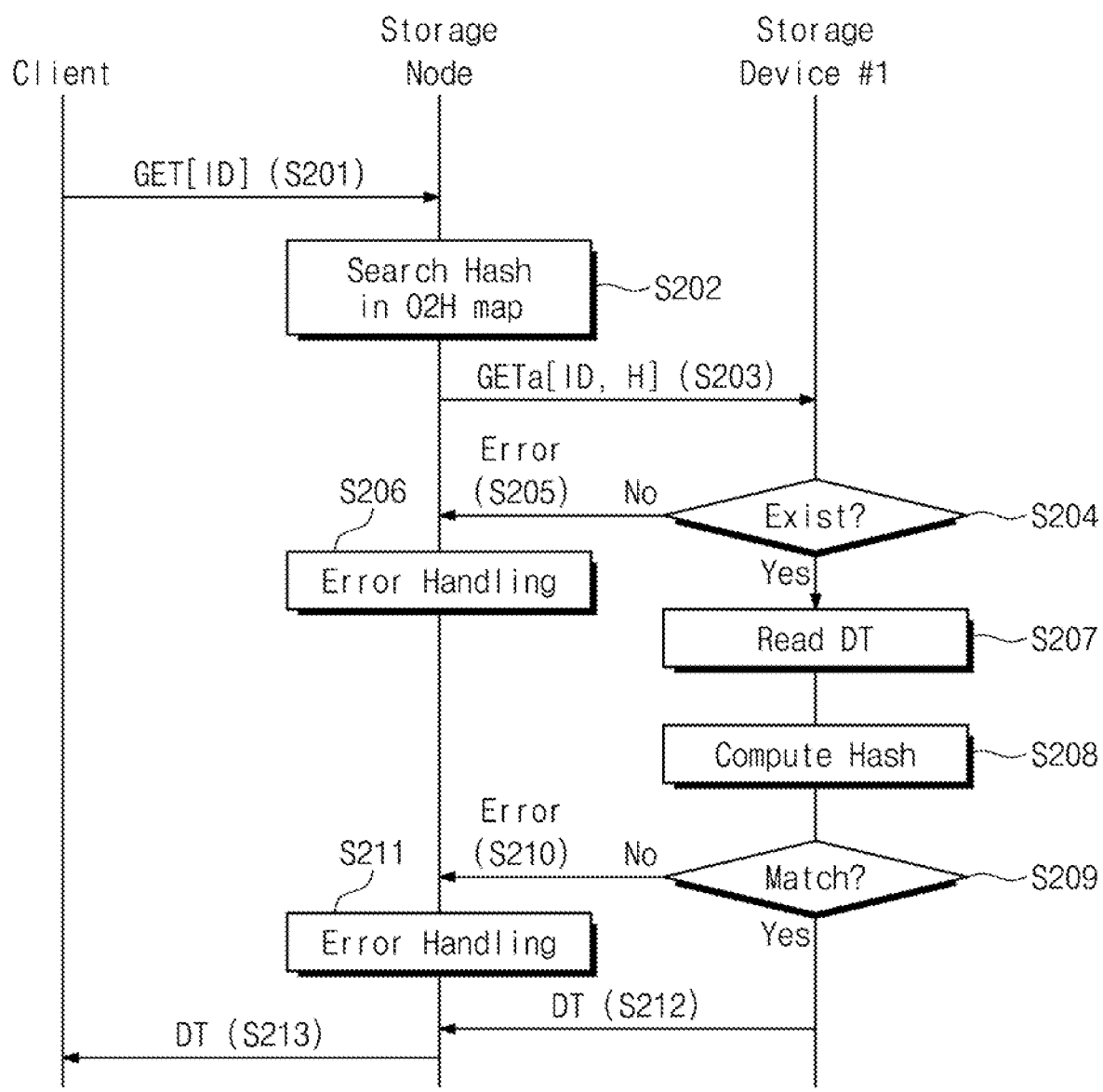
FIG. 9 is a flowchart illustrating an operation of a server system of FIG. 1 according to an embodiment of the present disclosure.

FIG. 9 is a flowchart illustrating an operation of a server system of FIG. 1. In an embodiment, an operation (i.e., a read operation) in which a specific object reads data from a storage device will be described with reference to FIG. 9. Referring to FIGS. 1 and 9, in operation S201, the client server 101 transmits a read request GET to the storage node 110 to perform the read operation. In an embodiment, the read request GET includes information about an object identifier ID.

In operation S202, the storage node 110 searches the object-to-hash table O2H for a hash value "H" corresponding to the received object identifier ID. For example, as described above, the object-to-hash table O2H of the storage node 110 may be used to manage mapping information between the object identifier ID and the hash value "H". The storage node 110 may search the object-to-hash table O2H for the hash value "H" corresponding to the received object identifier ID.

In operation S203, the storage node 110 transmits a read request GETa including the found hash value "H" to the first storage device 120. In an embodiment, the storage node 110 select a storage device, to which a read request is to be transferred, based on the found hash value "H", and this operation is similar to that described with reference to FIG. 6. Thus, additional description will be omitted to avoid redundancy. The read request GETa may additionally include the object identifier ID.

In operation S204, the first storage device 120 determines whether an entry corresponding to the received hash value "H" is present in the hash-to-physical table H2P. That the entry corresponding to the received hash value "H" is absent from the hash-to-physical table H2P may mean that data corresponding to the hash value "H" is not stored in the nonvolatile memories 122. In the case where the entry corresponding to the received hash value "H" is absent from the hash-to-physical table H2P, in operation S205, the first storage device 120 may return an error to the storage node 110. For example, the first storage device 120 may send an error message to the storage node 110. In operation S206, the storage node 110 performs error handling. The error handling may include re-sending the read request GET or sending an error message to the client.

In the case where the entry corresponding to the received hash value "H" is present in the hash-to-physical table H2P, in operation S207, the first storage device 120 reads the data DT from the nonvolatile memories 122. For example, the first storage device 120 may search the hash-to-physical table H2P for a physical address PA corresponding to the hash value "H". The first storage device 120 may read the data DT from an area corresponding to the found physical address PA.

In operation S208, the first storage device 120 performs the hash operation on the read data DT to compute a hash value. In operation S209, the first storage device 120 compares the computed hash value and the received hash value "H". That the computed hash value and the received hash value "H" do not match may mean that the requested data and the read data are different. In the case where the computed hash value and the received hash value "H" do not match, in operation S210, the first storage device 120 may return an error to the storage node 110. For example, the first storage device 120 may send an error message to the storage node 110. In operation S211, the storage node 110 may perform error handling. In an embodiment, even though not illustrated, in the case where the computed hash value and the received hash value "H" are different, the first storage device 120 may again perform the read operation for the requested data based on various read manners.

In the case where the computed hash value and the received hash value "H" match, in operation S212, the first storage device 120 transmits the data DT to the storage node 110. In operation S213, the storage node 110 transmits the data DT to the client server 101.

Figure 10:
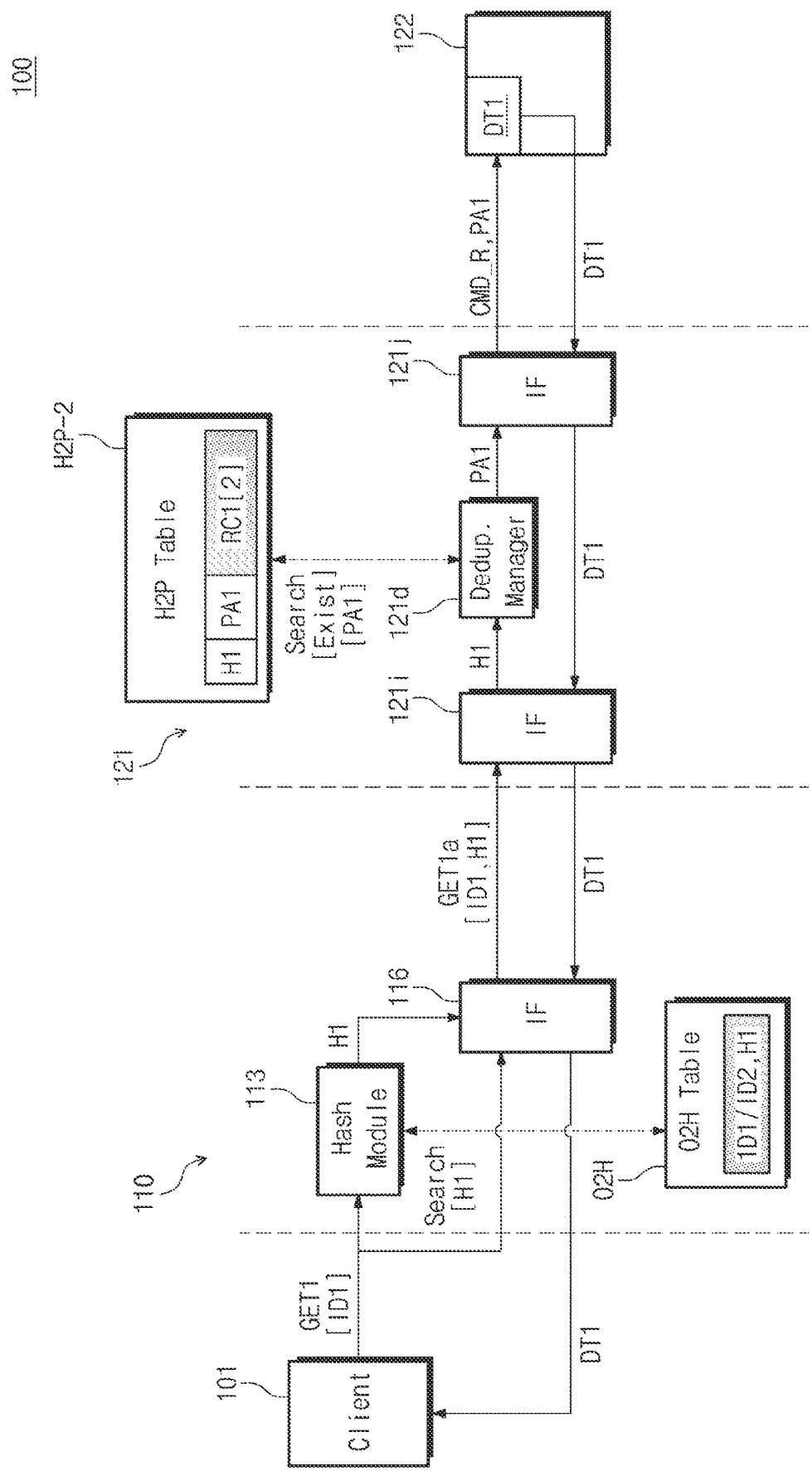
FIG. 10 is a diagram for describing a read operation according to the flowchart of FIG. 9.

FIG. 10 is a diagram for describing a read operation according to the flowchart of FIG. 9. Below, for brevity of drawing and for convenience of description, components that are unnecessary to describe a read operation according to the flowchart of FIG. 9 are omitted. In an embodiment, for brevity of drawing and for convenience of description, components associated with operation S204, operation S205, operation S209, and operation S210 of FIG. 9 (i.e., error detection) are omitted. However, the present disclosure is not limited thereto.

Referring to FIGS. 1, 9, and 10, the client server 101 transmits a first read request GET1 including the first object identifier ID1 to the storage node 110. The first read request GET1 may be a request for reading the first data DT1 referenced by the object corresponding to the first object identifier ID1.

The hash module 113 of the storage node 110 may search the object-to-hash table O2H for the hash value "H" corresponding to the first object identifier ID1 thus received. For example, the object-to-hash table O2H may include information where the first and second object identifiers ID1 and ID2 are mapped to the first hash value H1. In this case, the hash module 113 selects the first hash value H1 as a hash value corresponding to the first object identifier ID1, based on the object-to-hash table O2H. The host interface circuit 116 of the storage node 110 transmits a first read request GET1a including the first hash value H1 to the first storage device 120. The first read request GET1a may further include the first object identifier ID1.

The host interface circuit 121i of the first storage device 120 receives the first read request GET1a including the first hash value H1. The deduplication manager 121d may search the second hash-to-physical table H2P-2 for the first physical address PA1 corresponding to the first hash value H1. Information about the first physical address PA1 may be transferred to the memory interface circuit 121j of the first storage device 120.

The memory interface circuit 121j of the first storage device 120 transmits a read command CMD_R and the first physical address PA1 to at least one relevant nonvolatile memory of the nonvolatile memories 122. The at least one relevant nonvolatile memory of the nonvolatile memories 122 may output the first data DT1 stored in an area of the first physical address PAL The memory interface circuit 121j of the first storage device 120 may receive the first data DT1 from the at least one relevant nonvolatile memory of the nonvolatile memories 122 and may provide the first data DT1 to the client server 101 through the host interface circuits 121i and 116.

Figure 11:
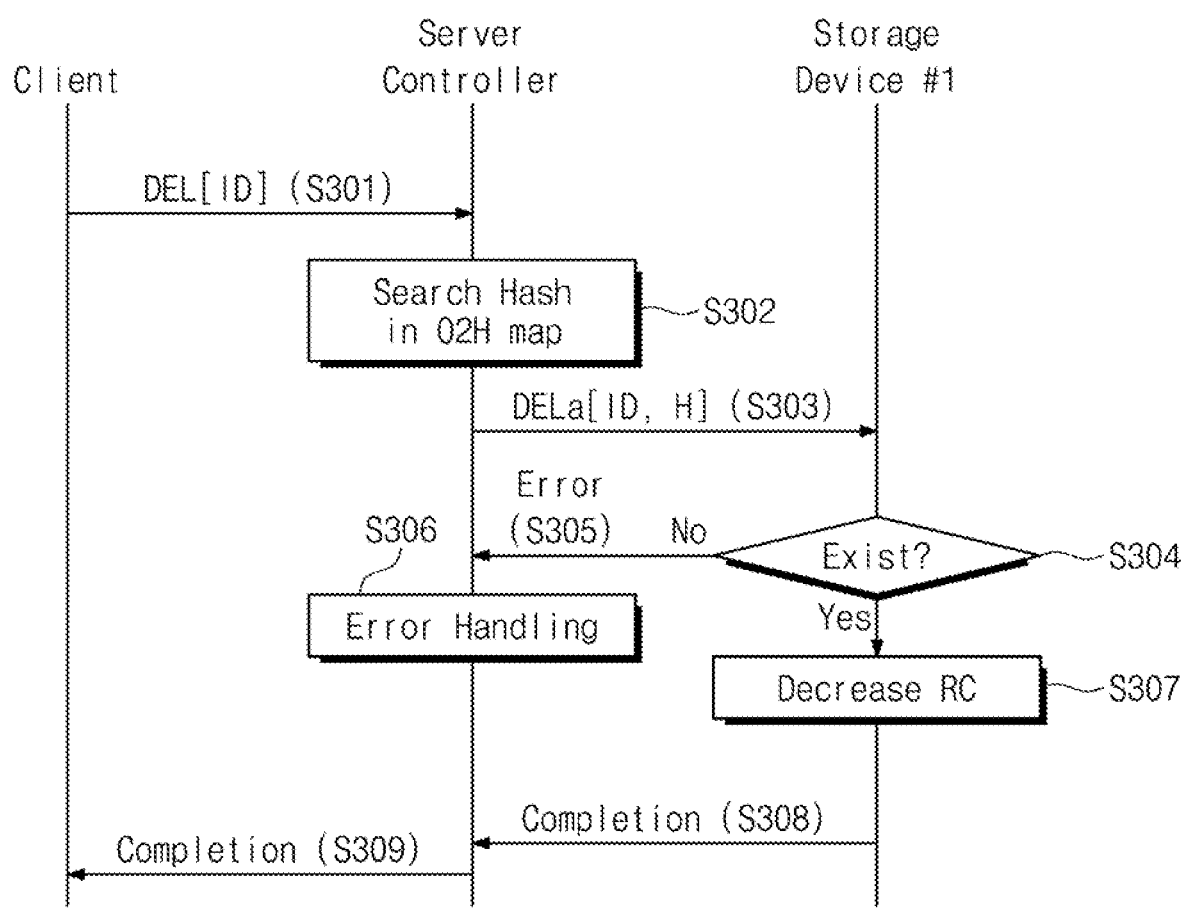
FIG. 11 is a flowchart illustrating an operation of a server system of FIG. 1 according to an embodiment of the present disclosure.

FIG. 11 is a flowchart illustrating an operation of a server system of FIG. 1. In an embodiment, an operation (i.e., a delete operation) in which data of a specific object is deleted from a storage device will be described with reference to FIG. 11.

Referring to FIGS. 1 and 11, in operation S301, the client server 101 may transmit a delete request DEL including the object identifier ID to the storage node 110. The delete request DEL may be a request for deleting data referenced by an object corresponding to the object identifier ID.

In operation S302, the storage node 110 searches the object-to-hash table O2H for the hash value "H" corresponding to the received object identifier ID. Operation S302 is similar to that described above, and thus, additional description will be omitted to avoid redundancy. In operation S303, the storage node 110 transmits a delete request DELa including the found hash value "H" to the first storage device 120. The delete request DELa may further include the object identifier ID.

In operation S304, the first storage device 120 determines whether an entry corresponding to the received hash value "H" is present in the hash-to-physical table H2P. That the entry corresponding to the received hash value "H" is absent from the hash-to-physical table H2P may mean that data corresponding to the hash value "H" is not stored in the nonvolatile memories 122. In an embodiment, in the hash-to-physical table H2P, that a reference count of an entry corresponding to the hash value "H" is "0" may have the same meaning that an entry corresponding to the hash value "H" does not exist.

In the case where the entry corresponding to the received hash value "H" is absent from the hash-to-physical table H2P, in operation S305, the first storage device 120 may return an error to the storage node 110. In operation S306, the storage node 110 may perform error handling. For example, the error handling may include re-sending the delete request DEL or sending an error message to the client.

In the case where the entry corresponding to the received hash value "H" is present in the hash-to-physical table H2P, in operation S307, the first storage device 120 decreases the reference count RC of the entry corresponding to the hash value "H" as much as a given value (e.g., "1"), in the hash-to-physical table H2P. In an embodiment, if the decreasing causes the reference count RC to decrease to 0, the first storage device 120 searches the hash-to-physical table H2P for a physical address PA corresponding to the hash value "H", and schedules a location of the nonvolatile memories 122 associated with the physical address PA to be deleted or marks the location invalid.

In operation S308, the first storage device 120 may transmit completion information about the delete request DELa to the storage node 110. In operation S309, the storage node 110 may transmit completion information about the delete request DEL to the client server 101.

Figure 12:
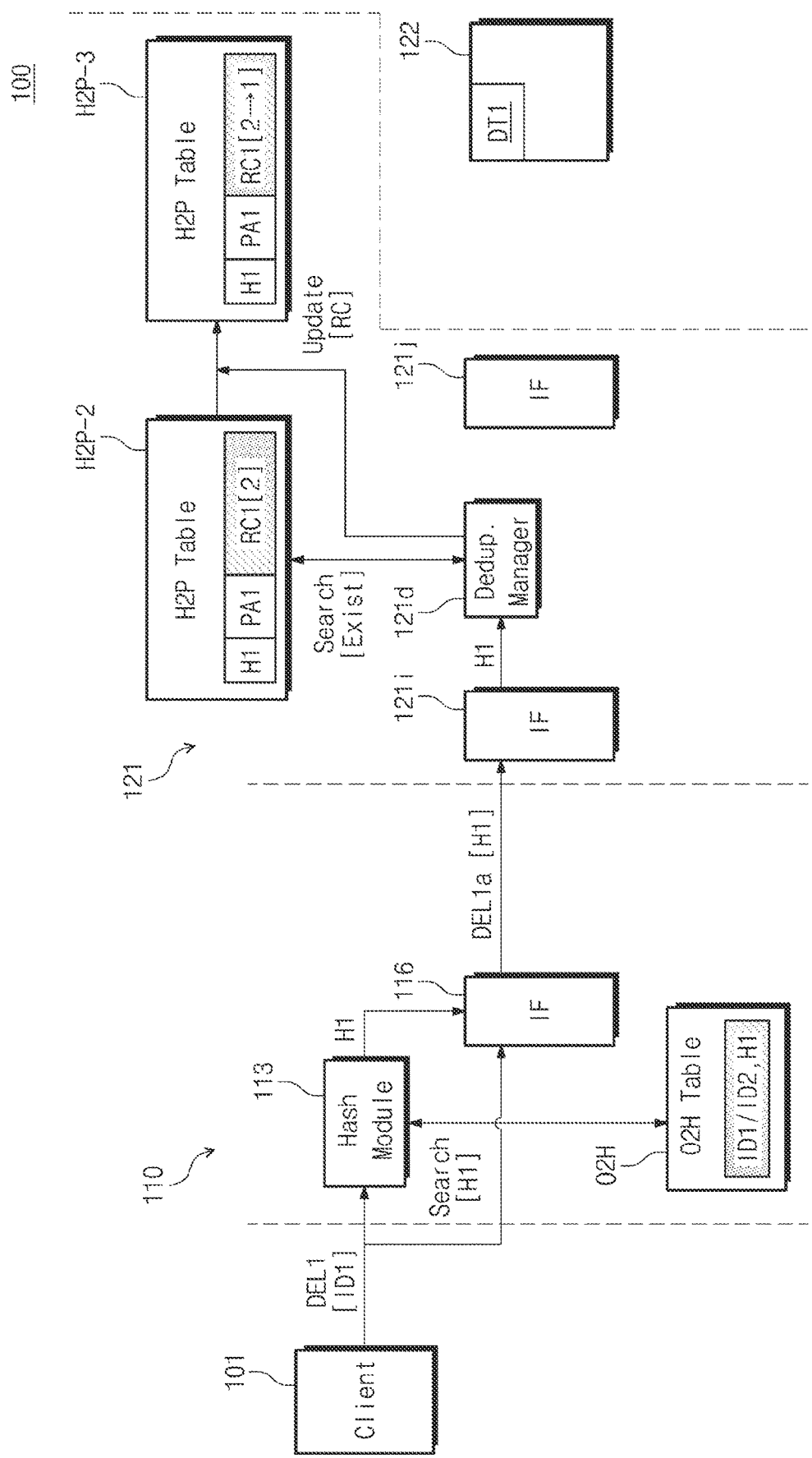
FIG. 12 is a diagram for describing a delete operation according to the flowchart of FIG. 11.

FIG. 12 is a diagram for describing a delete operation according to the flowchart of FIG. 11. Below, for brevity of drawing and for convenience of description, components that are unnecessary to describe a delete operation according to the flowchart of FIG. 12 are omitted. In an embodiment, processing that is made in operation S304 and operation S305 of FIG. 11 will be omitted.

Referring to FIGS. 1, 11, and 12, the client server 101 transmits a first delete request DEL1 including the first object identifier ID1 to the storage node 110. The first delete request DEL1 may be a request for deleting the first data DT1 referenced by the object corresponding to the first object identifier ID1.

The hash module 113 of the storage node 110 searches the object-to-hash table O2H for the first hash value H1 corresponding to the first object identifier ID1 thus received. This is described above, and thus, additional description will be omitted to avoid redundancy. The host interface circuit 116 of the storage node 110 may transmit a first delete request DEL1a including the first hash value H1 to the first storage device 120.

The host interface circuit 121i of the first storage device 120 receives the first delete request DEL1a including the first hash value H1. The deduplication manager 121d searches the second hash-to-physical table H2P-2 for the first reference count RC1 corresponding to the first hash value H1. The deduplication manager 121d updates the second hash-to-physical table H2P-2 to a third hash-to-physical table H2P-3 in response to the first delete request DEL1a, by decreasing the first reference count RC1 corresponding to the first hash value H1. For example, the deduplication manager 121d may decrease the first reference count RC1 by 1.

In an embodiment, in the hash-to-physical table H2P-2, that the first reference count RC1 is "2" means that the number of objects making reference to the first data DT1 associated with the first hash value H1 corresponding to the first reference count RC1 is "2". Afterwards, because the first data DT1 referenced by the object of the first object identifier ID1 is deleted, the number of objects making reference to the first data DT1 associated with the first hash value H1 is changed to "1". Thus, a value of the first reference count RC1 is decreased to "1".

In an embodiment, the storage node 110 may update the object-to-hash table O2H. For example, as illustrated in FIG. 12, the object-to-hash table O2H may be updated by releasing the mapping of the first object identifier ID1 targeted for a delete request from among the first and second object identifiers ID1 and ID2 corresponding to the first hash value H1. For example, the object-to-hash table O2H may be updated so that an entry including the first object identifier ID1 is no longer mapped to the first hash value H1 or so that the entry is deleted.

Figure 13:
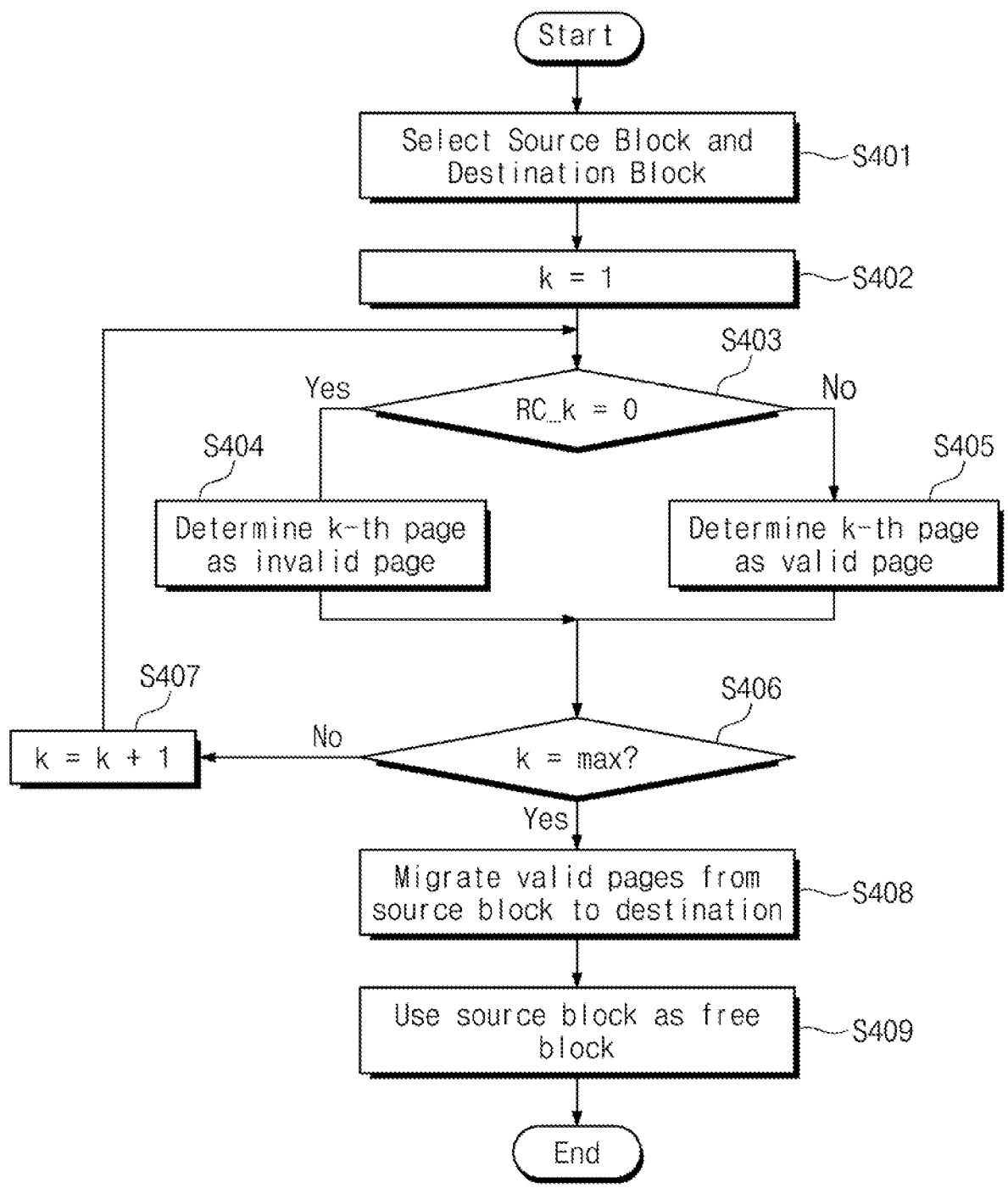
FIG. 13 is a block diagram illustrating an operation of a storage device of FIG. 1 according to an embodiment of the present disclosure.

FIG. 13 is a block diagram illustrating an operation of a storage device of FIG. 1. In an embodiment, a garbage collection operation of the first storage device 120 will be described with reference to FIG. 13. In an embodiment, the garbage collection operation in FIG. 13 may be performed by the flash translation layer FTL described with reference to FIG. 3.

Referring to FIGS. 1, 5, and 13, in operation S401, the first storage device 120 selects a source block and a destination block. For example, each of the nonvolatile memories 122 may include a plurality of memory blocks. The storage controller 121 of the first storage device 120 may select a source block and a destination block from the plurality of memory blocks. In an embodiment, the destination block is a free memory block.

In operation S402, a variable "k" is set to "1". The variable "k" is used to describe an iterative operation according to an embodiment of the present disclosure, and not intended to limit the scope of the invention.

In operation S403, the first storage device 120 determines whether a k-th reference count RC_k is "0". For example, the k-th reference count RC_k may indicate a reference count corresponding to a physical address of a k-th physical page of the source block. The first storage device 120 may determine whether the k-th reference count RC_k of the hash-to-physical table H2P is "0".

That the k-th reference count RC_k is "0" may mean that there is no object making reference to data stored at the physical page associated with the k-th reference count RC_k (i.e., at the k-th physical page of the source block). In the case where the k-th reference count RC_k is "0", in operation S404, the first storage device 120 may determine the k-th physical page of the source block as an invalid page.

That the k-th reference count RC_k is not "0" may mean that there is an object making reference to the data stored at the physical page associated with the k-th reference count RC_k (i.e., at the k-th physical page of the source block). In the case where the k-th reference count RC_k is not "0", in operation S405, the first storage device 120 determines the k-th physical page of the source block as a valid page.

In operation S406, whether the variable "k" is a maximum value is determined. For example, whether the above valid/invalid determination operation is completely performed on all pages included in the source block is determined. When the variable "k" is not the maximum value, in operation S407, the variable "k" may increase as much as "1", and then, the first storage device 120 performs operation S403.

When the variable "k" is the maximum value, in operation S408, the first storage device 120 migrates physical pages determined as a valid page from the source block to the destination block. In operation S409, the first storage device 120 may use the source block as a free block. In an embodiment, the migration includes migrating physical pages determined as valid from the source block and valid pages from one other block to the destination block.

As described above, a storage device according to an embodiment of the present disclosure may check the number of objects making reference to data, based on a reference count. Accordingly, a deduplication function may be provided by a storage device.

Figure 14:
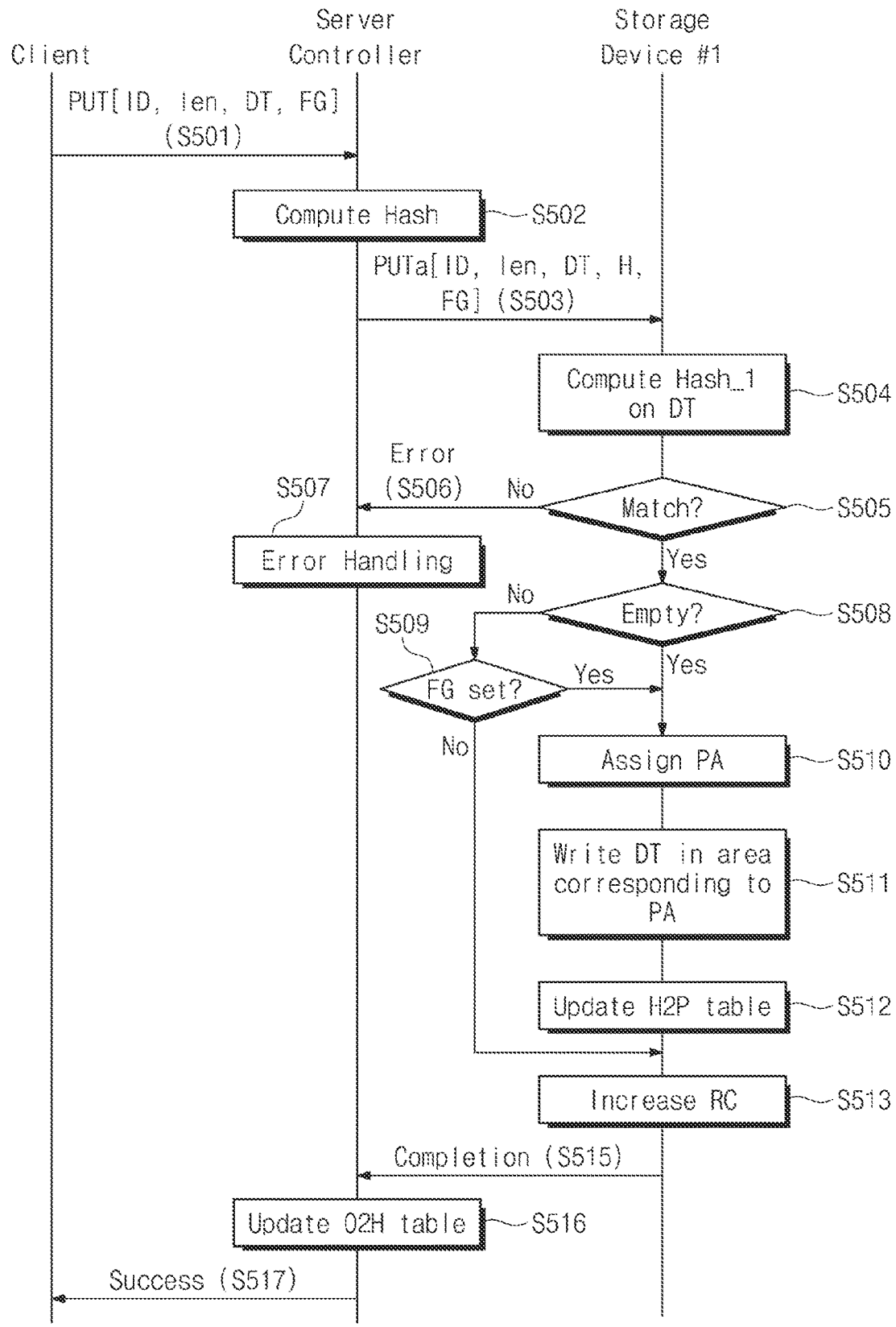
FIG. 14 is a flowchart illustrating an operation of a server system of FIG. 1 according to an embodiment of the present disclosure.

FIG. 14 is a flowchart illustrating an operation of a server system of FIG. 1. For convenience of description, additional description associated with the components described above will be omitted to avoid redundancy. Referring to FIGS. 1 and 14, in operation S501, the client server 101 transmits the write request PUT to the storage node 110. The write request PUT may include the object identifier ID, the data length len, the data DT, and a flag FG. In an embodiment, the flag FG refers to information for enabling/disabling the deduplication function of the first storage device 120.

The storage node 110 and the first storage device 120 may perform operation S502, operation S503, operation S504, operation S505, operation S506, and operation S507. Operation S502, operation S503, operation S504, operation S505, operation S506, and operation S507 are similar to operation S102, operation S103, operation S104, operation S105, operation S106, and operation S107 of FIG. 6 except that the flag FG is used, and thus, additional description will be omitted to avoid redundancy.

When a result of operation S505 indicates a "match", in operation S508, the first storage device 120 determines whether an entry corresponding to the received hash value "H" is present in the hash-to-physical table H2P. When the entry corresponding to the received hash value "H" is absent from the hash-to-physical table H2P, the first storage device 120 may perform operation S510, operation S511, operation S512, and operation S513. Operation S510, operation S511, operation S512, and operation S513 are similar to operation S109, operation S110, operation S111, and operation S112 of FIG. 6, and thus, additional description will be omitted to avoid redundancy.

When the entry corresponding to the received hash value "H" is present in the hash-to-physical table H2P, in operation S509, the first storage device 120 determines whether the flag FG is set. For example, the flag FG may refer to information for disabling the deduplication function with regard to data that a specific object makes reference to. That is, with regard to a specific write request, in the case where the flag FG is set, the data DT corresponding to the specific write request may be stored in the nonvolatile memories 122 (i.e., duplicate data may be stored therein), regardless of whether the data DT are stored therein. With regard to a specific write request, in the case where the flag FG is not set (e.g., cleared), as in the above description given with reference to FIG. 6, the same data, that is, duplicate data is not stored.

That is, in the case where the flag FG is not set, the first storage device 120 performs operation S513 without storing the data DT. In contrast, in the case where the flag FG is set, the first storage device 120 stores the data DT through operation S510 to operation S512. In this case, the data DT, that is, duplicate data may be stored in the nonvolatile memories 122. In an embodiment, the flag FG may be set in units of I/O. The flag FG may be set to guarantee the reliability of data that a specific object makes reference to.

Afterwards, the first storage device 120, the storage node 110, the client server 101 may perform operation S515, operation S516, and operation S517. Operation S515, operation S516, and operation S517 are similar to operation S113, operation S114, and operation S115 of FIG. 6, and thus, additional description will be omitted to avoid redundancy.

Figure 15:
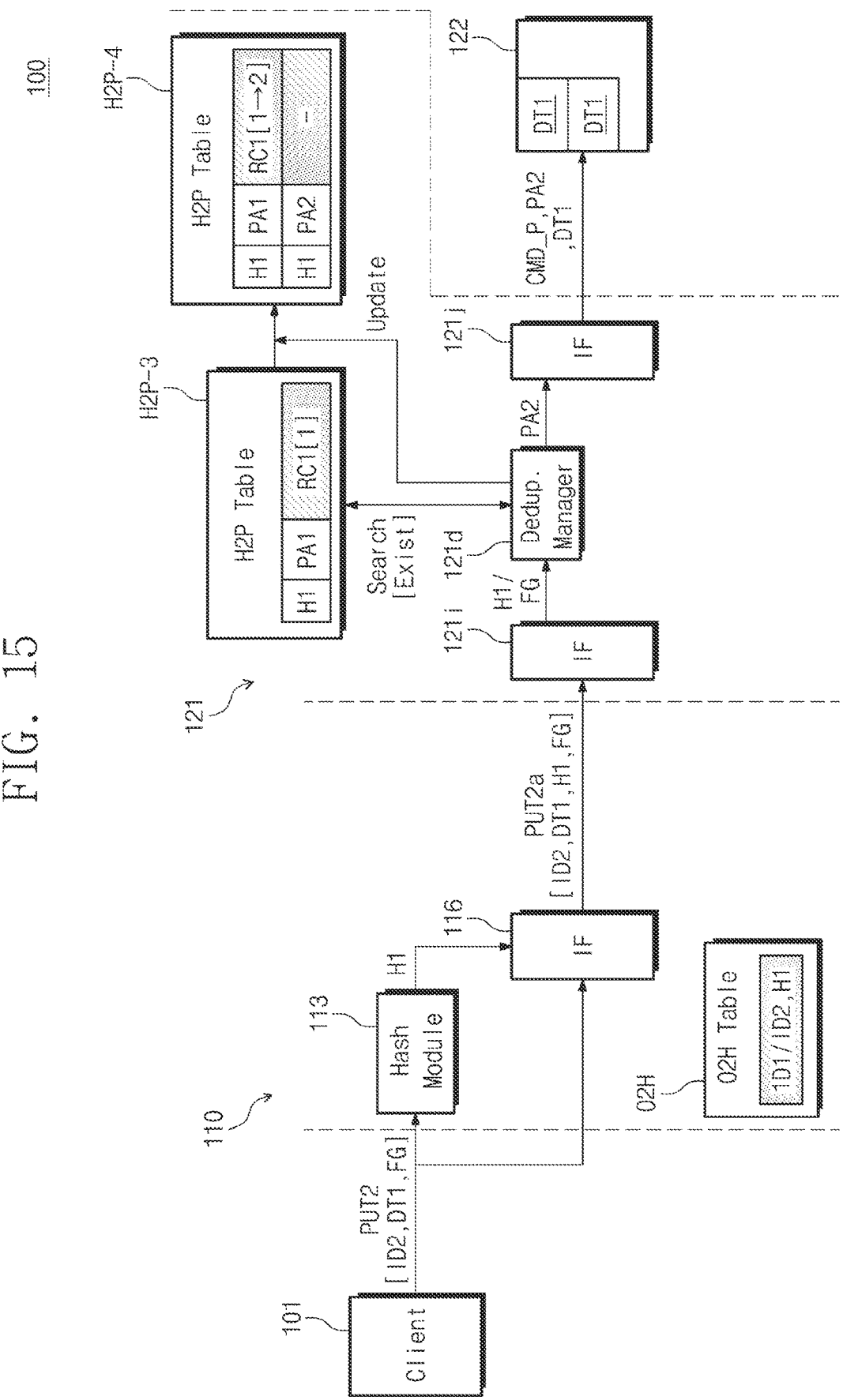
FIG. 15 is a diagram for describing an operation according to the flowchart of FIG. 14.

FIG. 15 is a diagram for describing an operation according to the flowchart of FIG. 14. Below, for brevity of drawing and for convenience of description, components that are unnecessary to describe a write operation according to the flowchart of FIG. 14 are omitted. In an embodiment, for brevity of drawing and for convenience of description, a configuration where a data deduplication function is disabled during an operation according to the flowchart of FIG. 14 will be described.

Referring to FIGS. 1, 14, and 15, the client server 101 transmits a second write request PUT2 to the storage node 110. The second write request PUT2 may include the second object identifier ID2, the first data DT1, and the flag FG.

The hash module 113 of the storage node 110 computes the first hash value H1 by performing the hash operation on the first data DT. The host interface circuit 116 of the storage node 110 transmits a second write request PUT2a including the first hash value H1 to the first storage device 120. The second write request PUT2a may further include the second object identifier ID2, the first data DT1, and the flag FG.

The host interface circuit 121i of the first storage device 120 may receive the second write request PUT2a including the first hash value H1. The deduplication manager 121d of the first storage device 120 determines whether an entry corresponding to the first hash value H1 is present in the hash-to-physical table H2P. In the embodiment of FIG. 15, the entry corresponding to the first hash value H1 may be present in the hash-to-physical table H2P. In this case, the deduplication manager 121d assigns a second physical address PA2 in response to the flag FG being set. For example, in the embodiment of FIG. 8, for data deduplication, in the case where an entry corresponding to a specific hash value is present in the hash-to-physical table H2P, a write operation for data is omitted. In contrast, in the embodiment of FIG. 15, because the data deduplication function is disabled by setting the flag FG, even though an entry corresponding to a specific hash value is present in the hash-to-physical table H2P, the deduplication manager 121d performs a write operation for data.

The memory interface circuit 121j of the first storage device 120 transmits the program command CMD_P, the second physical address PA2, and the first data DT1 to at least one of the nonvolatile memories 122. The at least one of the nonvolatile memories 122 may store the first data DT1 in an area corresponding to the second physical address PA2. In this case, the first data DT1, that is, duplicate data may be stored in different areas.

The deduplication manager 121d may generate a fourth hash-to-physical table H2P-4 by adding the entry corresponding to the first hash value H1 to the hash-to-physical table H2P-3. In an embodiment, a reference count of the added entry may replace information about an object identifier.

In an embodiment, the storage node 110 may update the object-to-hash table O2H as in the above description, and thus, additional description will be omitted to avoid redundancy.

As described above, according to embodiments of the present disclosure, the duplicate data store function for the reliability of data may be provided by disabling the data deduplication function with respect to data that specific objects make reference to.

Figure 16:
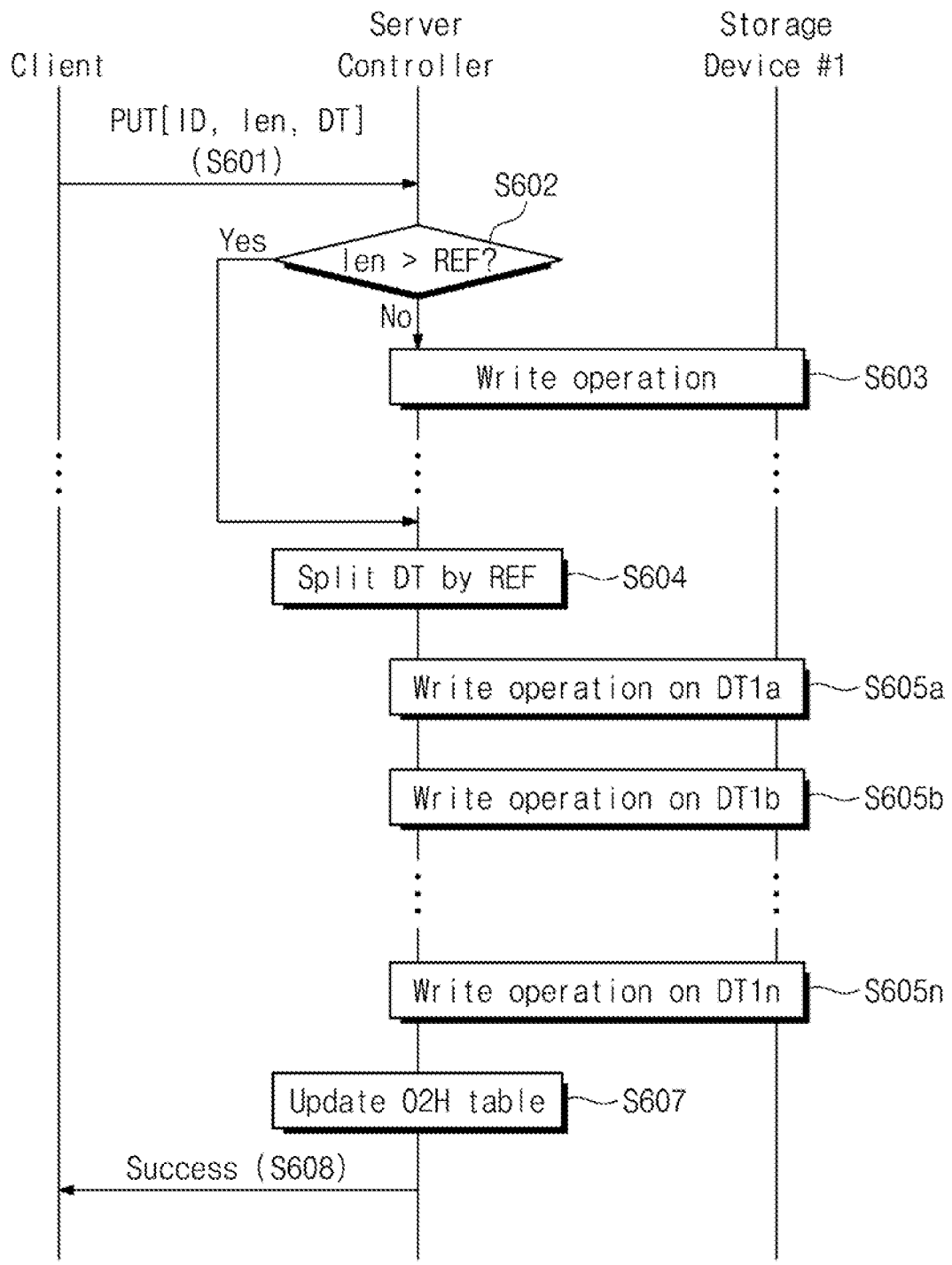
FIG. 16 is a flowchart illustrating an operation of a server system of FIG. 1 according to an embodiment of the present disclosure.

FIG. 16 is a flowchart illustrating an operation of a server system of FIG. 1. For convenience of description, additional description associated with the components described above will be omitted to avoid redundancy. Referring to FIGS. 1 and 16, in operation S601, the client server 101 transmits a write request PUT including the object identifier ID, the data length len, and the data DT to the storage node 110.

In an embodiment, a length of data received from the client server 101 and one object makes reference to may be variously changed. In this case, a hash module, of which the amount of computation is large, may be used to compute an appropriate hash value with respect to data of various lengths. This hash module may cause a reduction in performance and an increase in area. Accordingly, prior to processing, data received from the client server 101 may be split into segment data to have a size of a given reference value REF.

For example, in operation S602, the storage node 110 determines whether the received data length len is larger than the reference size REF. When the received data length len is not larger than the reference size REF, in operation S603, the storage node 110 and the first storage device 120 perform a write operation for the data DT. In an embodiment, the write operation in operation S603 is similar to the write operation between the storage node 110 and the first storage device 120 described with reference to FIGS. 1 to 15.

When the received data length len is larger than the reference size REF, in operation S604, the storage node 110 splits the data DT by the reference size REF. For example, the data DT could be split into two or more pieces of data (e.g., DT1a, DT1b, ..., DT1n), where each piece is less than or equal the reference size REF. Afterwards, in operation S605a to operation S605n, the storage node 110 and the first storage device 120 perform write operations on the split data, respectively. The write operations in operation S605a to operation S605n may be similar to the write operation between the storage node 110 and the first storage device 120 described with reference to FIGS. 1 to 15. In an embodiment, even in the case of a data split from the same data, the split data may be stored in different storage devices depending on computed hash values. For example, first segment data split from first data may be stored in the first storage device 120 or the second storage device 130 depending on a computed hash value.

Afterwards, in operation S607, the storage node 110 updates the object-to-hash table O2H. For example, the storage node 110 may reconfigure object identifiers of the respective split data, may compute hash values of the respective split data, and may update the object-to-hash table O2H based on a mapping relationship between the reconfigured object identifiers and the computed hash values. For example, if data that hashes to a first hash value is split into first data and second data, a hash operation performed on the first data will result in a second hash value different from the first hash value, and hash operation performed on the seconds data will result in a third hash value different from the first and second hash values. The first entry in the object-to-hash table O2H including a certain object identifier and the first hash value could be replaced with a second entry including the certain object identifier and the second hash value and a third entry including the certain object identifier and the third hash value. In operation S608, the storage node 110 may transmit completion information to the client server 101.

As described above, in the case where a size of data received from the client server 101 is larger than the reference size REF, the client server 101 may split the data to have a reference size REF or split the data based on the reference size REF. In this case, the size and the amount of computation of a hash module for computing a hash value decrease, and thus, a server system with improved performance may be provided.

Figure 17:
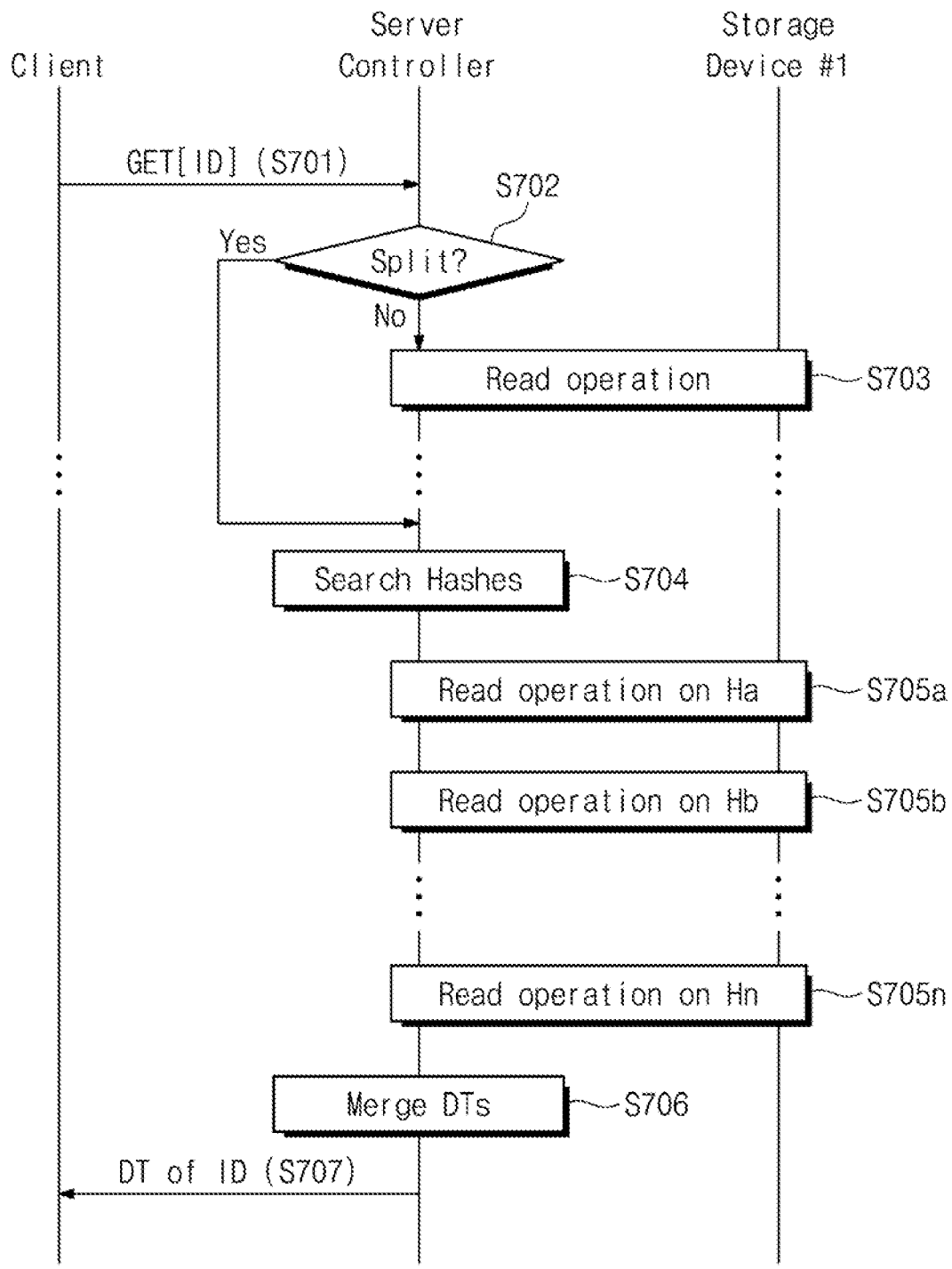
FIG. 17 is a flowchart illustrating an operation of a server system of FIG. 1 according to an embodiment of the present disclosure.

FIG. 17 is a flowchart illustrating an operation of a server system of FIG. 1. For convenience of description, additional description associated with the components described above will be omitted to avoid redundancy. Referring to FIGS. 1 and 17, in operation S701, the client server 101 transmits the read request GET including the object identifier ID to the storage node 110.

In operation S702, the storage node 110 determines whether data corresponding to the received object identifier ID has been split. For example, the storage node 110 may split specific data based on the write method described with reference to FIG. 16 and may store the split data in storage devices.

When it is determined that the data corresponding to the received object identifier ID has not been split, in operation S703, the storage node 110 and the first storage device 120 perform a read operation. The read operation may be similar to the read operation described with reference to FIGS. 1 to 15 and thus, additional description will be omitted to avoid redundancy.

When it is determined that the data corresponding to the received object identifier ID has been split, in operation S704, the storage node 110 searches for hash values based on the object identifiers reconfigured with respect to the object identifier ID. In operation S705a to operation S705n, the storage node 110 and the first storage device 120 performs read operations on the found hash values Ha to Hn, respectively. The read operations in operation S705a to operation S705n may be similar to the read operation described with reference to FIGS. 1 to 15 and thus, additional description will be omitted to avoid redundancy.

In operation S706, the storage node 110 merges a plurality of data received through the read operations. For example, the read pieces of split data may be combined to generate merged data. In operation S707, the storage node 110 may transmit the merged data as the data DT corresponding to the object identifier ID to the client server 101.

Figure 18:
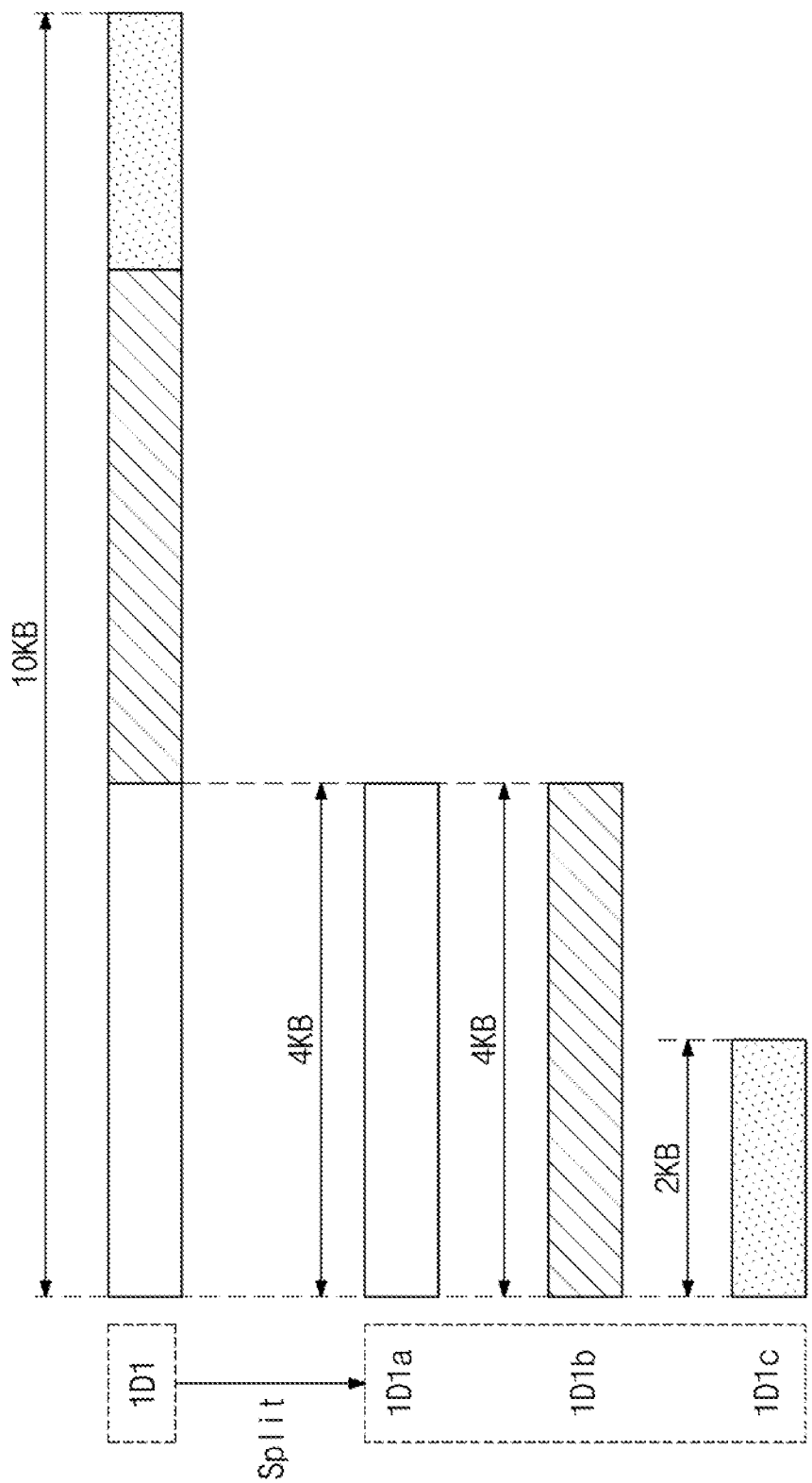
FIGS. 18 and 19 are diagrams illustrating examples of data split described with reference to FIGS. 16 and 17.
Figure 19:
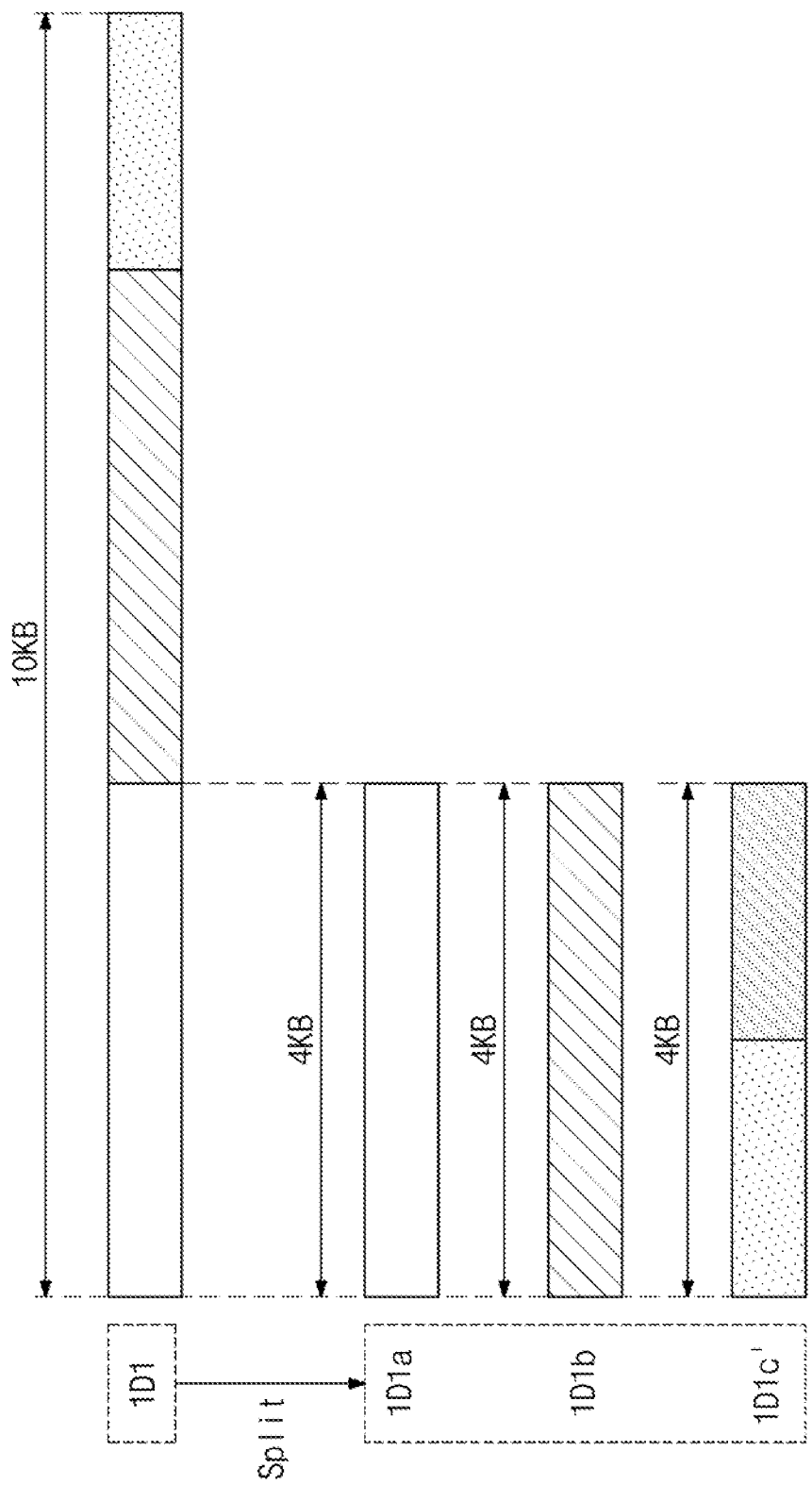

FIGS. 18 and 19 are diagrams illustrating examples of data split described with reference to FIGS. 16 and 17. Referring to FIGS. 18 and 19, data corresponding to the first object identifier ID1 may have a size of 10 KB. In the case where the reference size REF is 4 KB, the data corresponding to the first object identifier ID1 is split into units of 4 KB, and object identifiers ID1a, ID1b, and ID1c are assigned to the split (or segment) data, respectively. For example, the data may be split into whole units of 4 KB and a remainder less than 4 KB when the size of the data is not divisible evenly by the reference size REF.

In an embodiment, the way to split data is determined such that a size of split data is smaller than a reference size. For example, as illustrated in FIG. 18, the split data corresponding to "ID1a" may have a size of 4 KB, the split data corresponding to "ID1b" may have a size of 4 KB, and the split data corresponding to "ID1c" may have a size of 2 KB.

In contrast, the way to split data may be determined such that a size of split data is the same as a reference size. For example, as illustrated in FIG. 19, split data respectively corresponding to "ID1a", "ID1b", and "ID1c" may have 4 KB. In this case, a portion of the split data corresponding to "ID1c", that is, 2 KB may be actual data, and the remaining portion thereof, that is, 2 KB may be dummy data or padding data. For example, the data corresponding to the first object identifier ID1 may be increased in size by appending the dummy or padding data so the result can be divided evenly by the reference size REF.

As described above, in a communication environment where a size of data is variable, to alleviate the burden on a hash operation, the storage node 110 according to the present disclosure may split and manage data based on the reference size REF.

Figure 20:
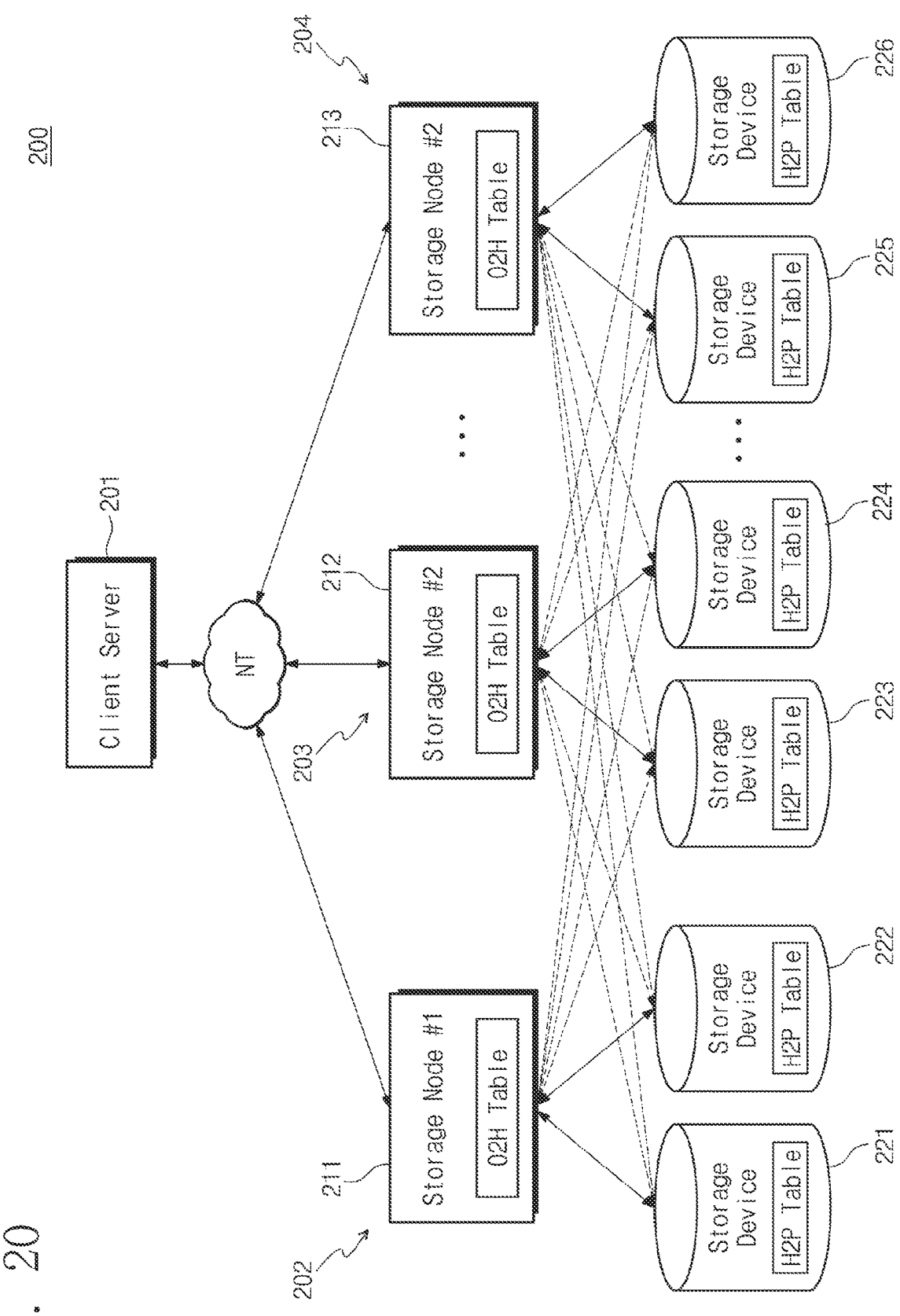
FIG. 20 is a diagram illustrating a server system according to an embodiment of the present disclosure.
Figure 21:
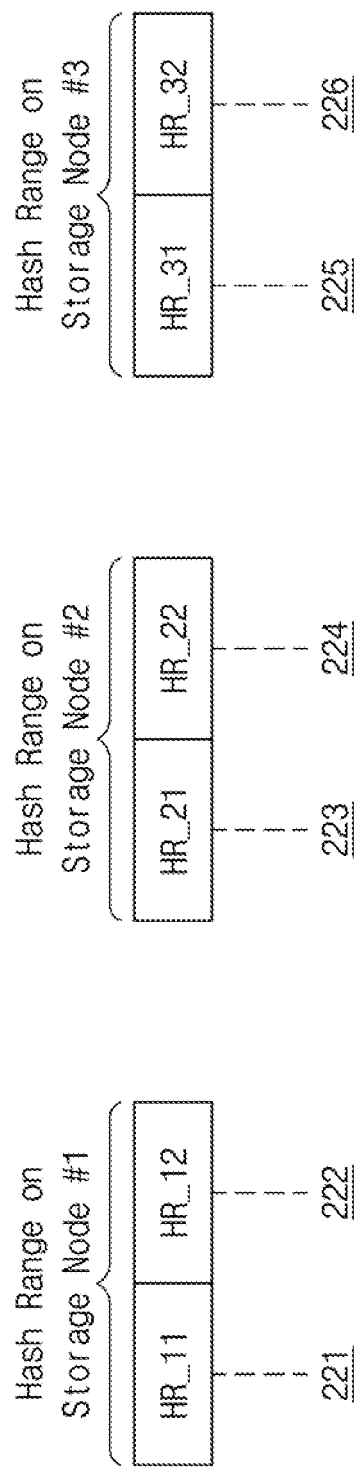
FIG. 21 is a diagram for describing a hash range managed at each storage node of a server system of FIG. 20.

FIG. 20 is a diagram illustrating a server system according to an embodiment of the present disclosure. FIG. 21 is a diagram for describing a hash range managed at each storage node of a server system of FIG. 20. Referring to FIG. 20, a server system 200 may include a client server 201 and a plurality of storage servers 202, 203, and 204. The client server 201 and the plurality of storage servers 202, 203, and 204 may communicate with each other over a network NT.

The plurality of storage servers 202, 203, and 204 may include a plurality of storage nodes 211, 212, and 213 and a plurality of storage devices 221, 222, 223, 224, 225, and 226. Components (e.g., the plurality of storage nodes 211, 212, and 213 and the plurality of storage devices 221, 222, 223, 224, 225, and 226) of the plurality of storage servers 202, 203, and 204 are similar to those described above, and thus, additional description will be omitted to avoid redundancy.

In an embodiment, in FIG. 20, the number of client servers, the number of storage servers, the number of storage nodes, and the number of storage devices are an example, and the number of client servers, the number of storage servers, the number of storage nodes, and the number of storage devices may be variously changed (e.g., may be increased/decreased).

The storage nodes 211, 212, and 213 may be configured to manage data corresponding to different object identifiers. For example, the client server 201 may access data corresponding to a first object identifier through the first storage node 211, may access data corresponding to a second object identifier through the second storage node 212, and may access data corresponding to a third object identifier through the third storage node 213.

The first storage node 211 included in the first storage server 202 may be configured to manage the storage devices 221 and 222. The second storage node 212 included in the second storage server 203 may be configured to manage the storage devices 223 and 224. The third storage node 213 included in the third storage server 204 may be configured to manage the storage devices 225 and 226.

In an embodiment, the first storage node 211 may be configured to access the storage devices 223, 224, 225, and 226 managed by the second and third storage nodes 212 and 213 different from the first storage node 211. For example, the first storage node 211 may access the storage devices 223, 224, 225, and 226 managed by the second and third storage nodes 212 and 213 over the network NT or any other separate communication interface. Likewise, the second storage node 212 may access the storage devices 221, 222, 225, and 226 managed by the first and third storage nodes 211 and 213 over the network NT or any other separate communication interface. Likewise, the third storage node 213 may access the storage devices 221, 222, 223, and 224 managed by the first and second storage nodes 211 and 212 over the network NT or any other separate communication interface.

In an embodiment, the first to third storage nodes 211, 212, and 213 are configured to manage hash ranges of the storage devices 221 to 226. For example, as illustrated in FIG. 21, the first storage node 211 manages hash ranges HR_11 and HR_12 respectively corresponding to the storage devices 221 and 222, the second storage node 212 manages hash ranges HR_21 and HR_22 respectively corresponding to the storage devices 223 and 224, and the third storage node 213 manages hash ranges HR_31 and HR_32 respectively corresponding to the storage devices 225 and 226. In an embodiment, the hash ranges HR_11, HR_12, HR_21, HR_22, HR_31, and HR_32 of the storage devices 221 to 226 are different. For example, in an embodiment, the hash ranges HR_11, HR_12, HR_21, HR_22, HR_31, and HR_32 do not overlap one another.

According to an embodiment of the present disclosure, the server system 200 provides a data deduplication function to a plurality of objects that make reference to the same data. For example, as described above, it is assumed that the client server 201 accesses the data associated with the first object identifier through the first storage node 211, accesses the data associated with the second object identifier through the second storage node 212, and accesses the data associated with the third object identifier through the third storage node 213.

In an embodiment, in a write operation, the client server 201 transmits a write request including the first object identifier ID1 and the first data DT1 to the first storage node 211. The first storage node 211 computes the first hash value H1 by performing the hash operation on the first data DT. The first storage node 211 determines a hash range to which the first hash value H1 belongs. The first storage node 211 may transmit a write request including the first data DT1 and the first hash value H1 to a storage device having the hash range to which the first hash value H1 belongs. For example, in the case where the first hash value H1 is included in the hash range HR_21 of the storage device 223 managed by the second storage node 212, the first storage node 211 may transmit the write request including the first data DT1 and the first hash value H1 to the storage device 223. The first storage node 211 may update the object-to-hash table O2H based on the first object identifier ID1 and the first hash value H1.

In an embodiment, in a read operation, the client server 201 transmits a read request including the first object identifier ID1 to the first storage node 211. The first storage node 211 searches the object-to-hash table O2H for the first hash value H1 corresponding to the first object identifier ID1. As in the above description given with reference to the write operation, the first storage node 211 may determine a hash range to which the first hash value H1 belongs, and may transmit a read request including the first hash value H1 to a storage device having the hash range to which the first hash value H1 belongs.

That is, the client server 201 may classify and manage the plurality of storage nodes 211 to 213 based on object identifiers, and the plurality of storage nodes 211 to 213 may manage a storage device where data are stored, based on a hash value of the data. As described above, a storage device may provide a data deduplication function based on a hash value and a reference count.

Figure 22:
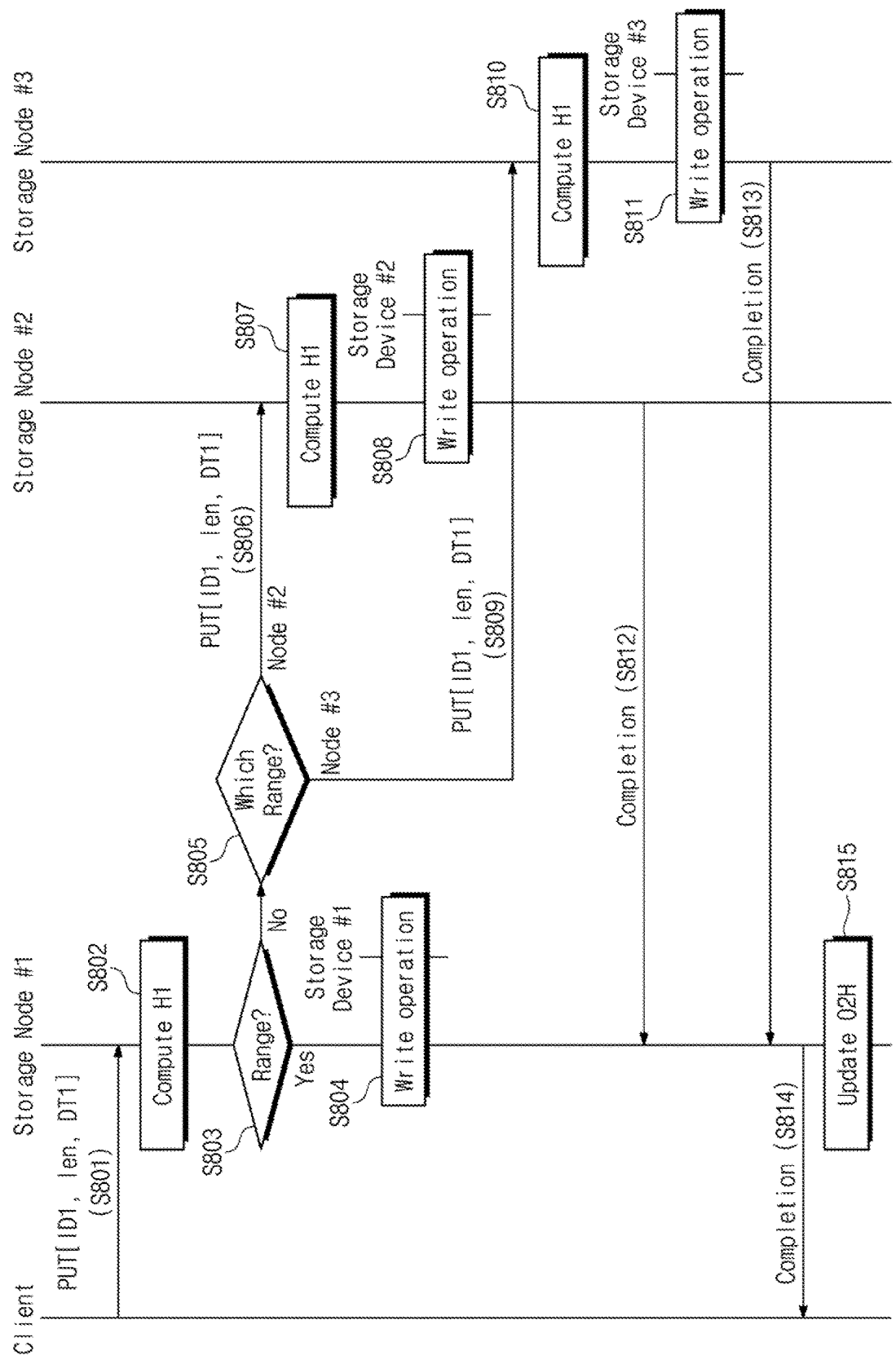
FIG. 22 is a flowchart illustrating an operation of a server system of FIG. 20 according to an embodiment of the present disclosure.

FIG. 22 is a flowchart illustrating an operation of a server system of FIG. 20. For convenience of description, additional description associated with the components described above will be omitted to avoid redundancy. Referring to FIGS. 20 and 22, in operation S801, the client server 201 transmits the write request PUT including the first object identifier ID, the data length len, and the first data DT to the first storage node 211. For example, the client server 201 may select a storage server or a storage node to be accessed, based on an object identifier. For example, a hash value may be determined from the object identifier, and the storage node associated with a hash range including the hash value may be the selected storage node.

In operation S802, the first storage node 211 performs the hash operation on the first data DT1 to compute the first hash value H1. In operation S803, the first storage node 211 determines whether the first hash value H1 is included in a hash range managed by the first storage node 211 itself. For example, as described with reference to FIG. 21, the hash ranges managed by the first storage node 211 is "HR_11" and "HR_12". The first storage node 211 may determine whether the first hash value H1 is included in the hash ranges HR_11 and HR_12.

When the first hash value H1 is included in a hash range managed by the first storage node 211, in operation S804, the first storage node 211 and the first storage device 221 or 222 perform a write operation.

When the first hash value H1 is not included in the hash ranges HR_11 and HR_12 managed by the first storage node 211, in operation S805, the first storage node 211 determines a hash range to which the first hash value H1 belongs to. For example, in the case where the first hash value H1 is included in the hash range HR_21 or the hash range HR_22, the first storage node 211 determines the first hash value H1 as corresponding to the second storage node 212. In the case where the first hash value H1 is included in the hash range HR_31 or the hash range HR_22, the first storage node 211 may determine the first hash value H1 as corresponding to the third storage node 213.

When it is determined that the first hash value H1 is included in the hash range HR21 or HR22 managed by the second storage node 212, in operation S806, the first storage node 211 transmits the write request PUT to the second storage node 212. In operation S807, the second storage node 212 computes the first hash value H1. In operation S808, the second storage node 212 and the storage device 223 or 224 perform a write operation.

When it is determined that the first hash value H1 is included in the hash range HR31 or HR32 managed by the third storage node 213, in operation S809, the first storage node 211 transmits the write request PUT to the third storage node 213. In operation S810, the third storage node 213 computes the first hash value H1. In operation S811, the third storage node 213 and the storage device 225 or 226 perform a write operation.

In an embodiment, the write operation in operation S804, the write operation in operation S808, and the write operation in operation S811 are similar to the write operation (i.e., a write operation of providing a deduplication function using a hash value and a reference count) described with reference to FIGS. 1 to 15, and thus, additional description will be omitted to avoid redundancy.

After the write operation in operation S808 has completed, in operation S812, the second storage node 212 may transmit completion information to the first storage node 211. After the write operation in operation S811 has completed, in operation S813, the third storage node 213 may transmit completion information to the first storage node 211.

When the write operation in operation S804 has completed or the completion information transmitted in operation S812 or operation S813 has been received, in operation S814, the first storage node 211 may transmit completion information to the client server 201.

In operation S815, the first storage node 211 updates the object-to-hash table O2H. For example, the first storage node 211 may update the object-to-hash table O2H based on mapping information between the first object identifier ID1 and the first hash value H1. In an embodiment, afterwards, in the case where the first storage node 211 receives a read request for the first object identifier ID1, the first storage node 211 may search the updated object-to-hash table O2H for the first hash value H1 and may perform a read operation based on the first hash value H1 thus found.

Figure 23:
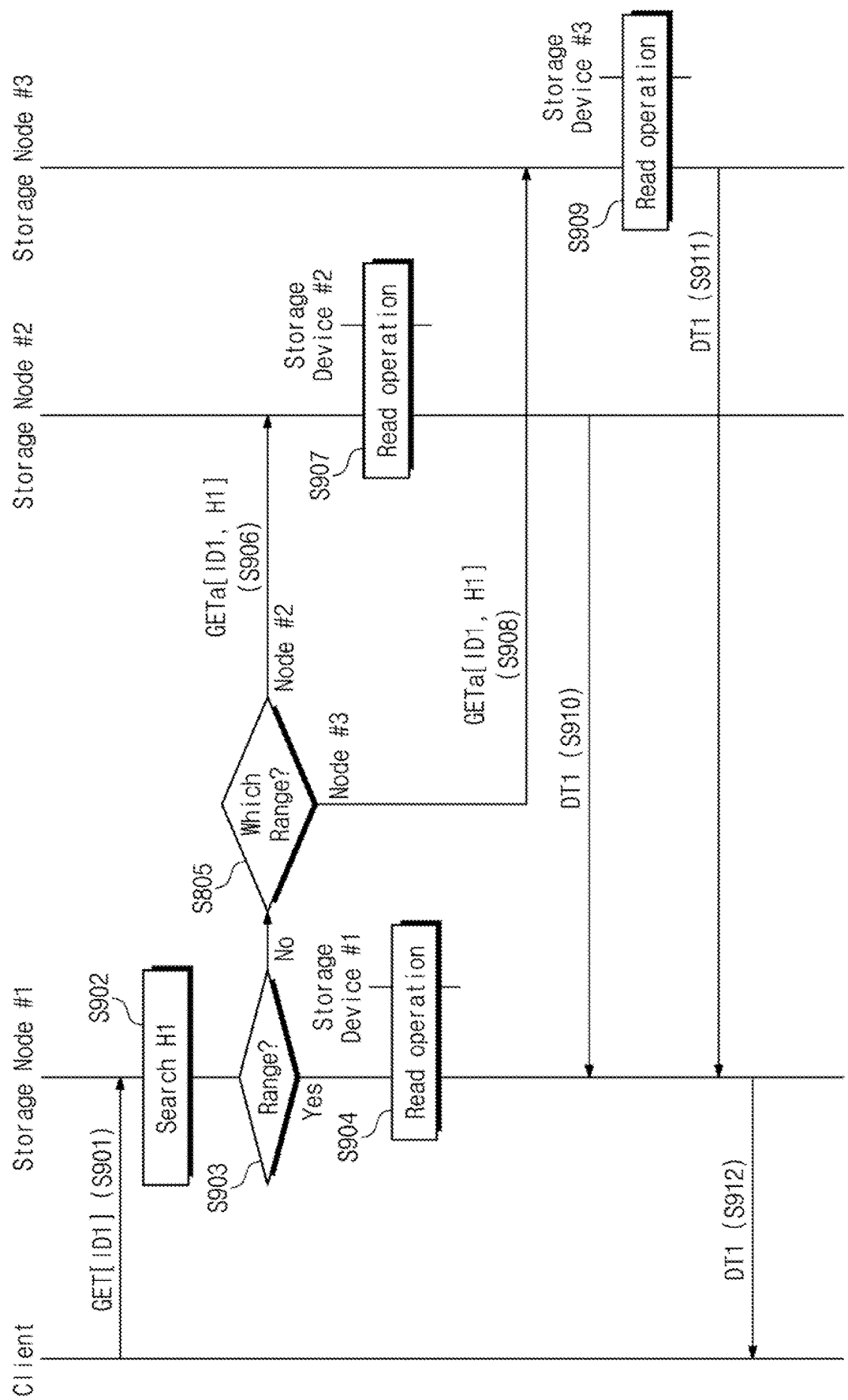
FIG. 23 is a flowchart illustrating an operation of a server system of FIG. 20 according to an embodiment of the present disclosure.

FIG. 23 is a flowchart illustrating an operation of a server system of FIG. 20. For convenience of description, additional description associated with the components described above will be omitted to avoid redundancy. Referring to FIGS. 20 and 23, in operation S901, the client server 201 transmits the read request GET including the first object identifier ID1 to the first storage node 211.

In operation S902, the first storage node 211 searches the object-to-hash table O2H for the first hash value H1 corresponding to the first object identifier ID1.

In operation S903, the first storage node 211 determines whether the first hash value H1 is included in a hash range managed by the first storage node 211 itself. Operation S903 is similar to operation S803 of FIG. 22, and thus, additional description will be omitted to avoid redundancy.

When the first hash value H1 is included in a hash range managed by the first storage node 211, in operation S904, the first storage node 211 and the first storage device 221 or 222 perform a read operation.

When the first hash value H1 is not included in the hash ranges HR_11 and HR_12 managed by the first storage node 211, in operation S905, the first storage node 211 determines a hash range to which the first hash value H1 belongs to. Operation S905 is similar to operation S805 of FIG. 22, and thus, additional description will be omitted to avoid redundancy.

When it is determined that the first hash value H1 is included in the hash range HR21 or HR22 of the second storage node 212, in operation S906, the first storage node 211 transmits a read request GETa including the first hash value H1 to the second storage node 212. In operation S907, the second storage node 212 and the storage device 223 or 224 perform a read operation.

When it is determined that the first hash value H1 is included in the hash range HR31 or HR32 of the third storage node 213, in operation S908, the first storage node 211 transmits the read request GETa including the first hash value H1 to the third storage node 213. In operation S909, the third storage node 213 and the storage device 225 or 226 perform a read operation.

In an embodiment, the read operation in operation S904, the read operation in operation S907, and the read operation in operation S909 are similar to the read operation (i.e., a read operation using a hash value) described with reference to FIGS. 1 to 15, and thus, additional description will be omitted to avoid redundancy.

After the read operation in operation S907 has completed, in operation S910, the second storage node 212 transmits the read data, that is, the first data DT1 to the first storage node 211. After the read operation in operation S909 has completed, in operation S911, the third storage device 213 transmits the read data, that is, the first data DT1 to the first storage node 211.

When the read operation in operation S904 has completed or the first data read in operation S910 or operation S911 has been received, in operation S912, the first storage node 211 transmits the first data DT1 to the client server 201.

While an embodiment has been described where the client server 201 performs an access (e.g., a write/read operation) associated with the first object identifier ID1 through the first storage node 211, the scope of the invention is not limited thereto. For example, in the case where the client server 201 performs an access associated with the second object identifier ID2 through the second storage node 212, the client server 201 may transmit a request corresponding to the second object identifier ID2 to the second storage node 212. The second storage node 212 may select a storage node or a storage device to be accessed based on a second hash value (i.e., in the case of a write operation, a hash value of second data; in the case of a read operation, a hash value associated with the second object identifier ID2).

An embodiment where a specific storage node accesses a storage device belonging to another storage node is described with reference to FIGS. 20 and 22, but the present disclosure is not limited thereto. For example, a specific storage node may access a storage device belonging to another storage node without passing through the other storage node. Alternatively, a specific storage node may access a storage device belonging to another storage node through a part (e.g., a switch) of components of the other storage node.

As described above, according to at least one embodiment of the present disclosure, a storage device and a storage server capable of implementing a data deduplication function based on a hash value of data are provided. In this case, the amount of information that is managed by a storage node may decrease, and the performance of the storage node may be improved.

Figure 24:
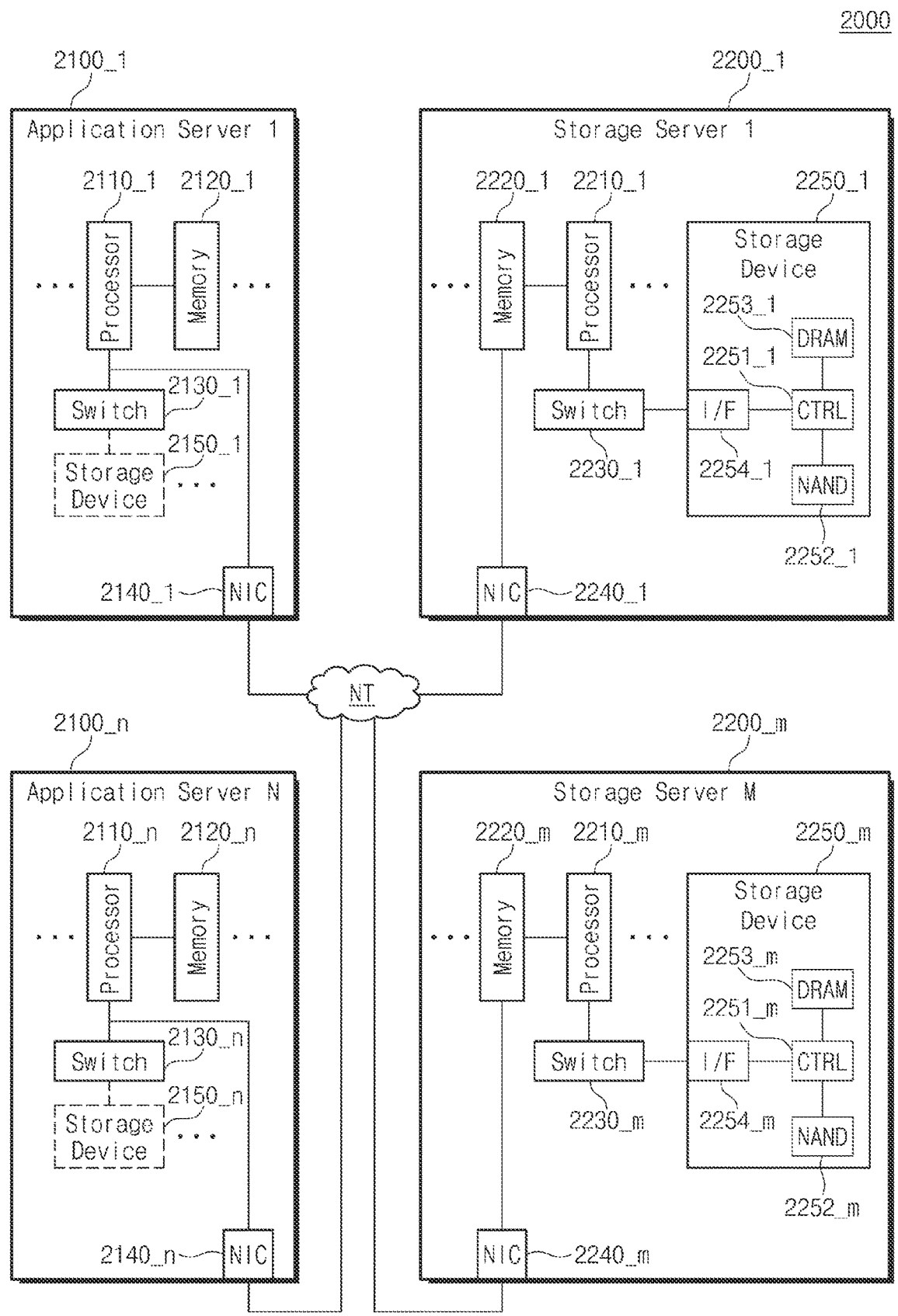
FIG. 24 is a block diagram illustrating a data center to which a storage device according to an embodiment of the present disclosure is applied.

FIG. 24 is a block diagram illustrating a data center to which a storage device according to an embodiment of the present disclosure is applied. A data center 2000 that is a facility maintaining a variety of data and providing various services with regard to the data may be called a "data storage center". The data center 2000 may be a system for a search engine or database management or may be a computing system used in various institutions. The data center 2000 may include a plurality of application servers 2100_1 to 2100_n and a plurality of storage servers 2200_1 to 2200_m. The number of application servers 2100_1 to 2100_n and the number of storage servers 2200_1 to 2200_m may be variously changed or modified.

Below, for convenience of description, an example of the first storage server 2200_1 will be described. Each of the remaining storage servers 2200_2 to 2200_m and the plurality of application servers 2100_1 to 2100_n may have a structure similar to that of the first storage server 2200_1.

The first storage server 2200_1 may include a processor 2210_1, a memory 2220_1, a switch 2230_1, a network interface connector (NIC) 2240_1, and a storage device 2250_1. The processor 2210_1 may perform overall operations of the first storage server 2200_1. The memory 2220_1 may store various instructions or data under control of the processor 2210_1. The processor 2210_1 may be configured to access the memory 2220_1 to execute various instructions or to process data. In an embodiment, the memory 2220_1 may include at least one of various kinds of memory devices such as a DDR SDRAM (Double Data Rate Synchronous DRAM), a HBM (High Bandwidth Memory), a HMC (Hybrid Memory Cube), a DIMM (Dual In-line Memory Module), an Optane DIMM, and an NVDIMM (Non-Volatile DIMM)

In an embodiment, the number of processors 2210_1 included in the first storage server 2200_1 and the number of memories 2220_1 included in the first storage server 2200_1 may be variously changed or modified. In an embodiment, the processor 2210_1 and the memory 2220_1 included in the first storage server 2200_1 may constitute a processor-memory pair, and the number of processor-memory pairs included in the first storage server 2200_1 may be variously changed or modified. In an embodiment, the number of processors 2210_1 included in the first storage server 2200_1 and the number of memories 2220_1 included in the first storage server 2200_1 may be different. The processor 2210_1 may include a single core processor or a multi-core processor.

Under control of the processor 2210_1, the switch 2230_1 may selectively connect the processor 2210_1 and the storage device 2250_1 or may selectively connect the NIC 2240_1 and the storage device 2250_1.

The NIC 2240_1 may connect the first storage server 2200_1 with the network NT. The NIC 2240_1 may include a network interface card, a network adapter, and the like. The NIC 2240_1 may be connected with the network NT through a wired interface, a wireless interface, a Bluetooth interface, or an optical interface. The NIC 2240_1 may include an internal memory, a DSP, a host bus interface, and the like and may be connected with the processor 2210_1 or the switch 2230_1 through the host bus interface. The host bus interface may include at least one of various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, and a CF (Compact Flash) card interface. In an embodiment, the NIC 2240_1 may be integrated with at least one of the processor 2210_1, the switch 2230_1, and the storage device 2250_1.

Under control of the processor 2210_1, the storage device 2250_1 may store data or may output the stored data. The storage device 2250_1 may include a controller 2251_1, a nonvolatile memory 2252_1, a DRAM 2253_1, and an interface 2254_1. In an embodiment, the storage device 2250_1 may further include a secure element (SE) for security or privacy.

The controller 2251_1 may control overall operations of the storage device 2250_1. In an embodiment, the controller 2251_1 may be an SRAM. In response to signals received through the interface 2254_1, the controller 2251_1 may store data in the nonvolatile memory 2252_1 or may output data stored in the nonvolatile memory 2252_1. In an embodiment, the controller 2251_1 may be configured to control the nonvolatile memory 2252_1 based on a toggle interface or an ONFI.

The DRAM 2253_1 may be configured to temporarily store data to be stored in the nonvolatile memory 2252_1 or data read from the nonvolatile memory 2252_1. The DRAM 2253_1 may be configured to store various data (e.g., metadata and mapping data) necessary for the controller 2251_1 to operate. The interface 2254_1 may provide a physical connection between the controller 2251_1 and the processor 2210_1, the switch 2230_1, or the NIC 2240_1. In an embodiment, the interface may be implemented to support a DAS (Direct-Attached Storage) manner that allows the direct connection of the storage device 2250_1 through a dedicated cable. In an embodiment, the interface 2254_1 may be implemented based on at least one of various above-described interfaces through a host interface bus.

The above components of the first storage server 2200_1 are provided as an example, and the present disclosure is not limited thereto. The above components of the first storage server 2200_1 may be applied to each of the remaining storage servers 2200_2 to 2200_m or each of the plurality of application servers 2100_1 to 2100_n. In an embodiment, storage devices 2150_1 to 2150_n of the application servers 2100_1 to 2100_n may be selectively omitted.

The plurality of application servers 2100_1 to 2100_n and the plurality of storage servers 2200_1 to 2200_m may communicate with each other over the network NT. The network NT may be implemented by using a Fibre channel (FC), an Ethernet, or the like. In this case, the FC may be a medium that is used in high-speed data transmission and may use an optical switch providing high performance/high availability. Depending on an access manner of the network NT, the storage servers 2200_1 to 2200_m may be provided as file storage, block storage, or object storage.

In an embodiment, the network NT may be a storage dedicated network such as a storage area network (SAN). For example, the SAN may be an FC-SAN that uses an FC network and is implemented in compliance with an FC protocol (FCP). Alternatively, the SAN may be an IP-SAN that uses a TCP/IP network and is implemented in compliance with an iSCSI (or SCSI over TCP/IP or an Internet SCSI) protocol. In an embodiment, the network NT may be a general network such as a TCP/IP network. For example, the network NT may be implemented in compliance with a protocol such as FCoE (FC over Ethernet), NAS (Network Attached Storage), or NVMe-oF (NVMe over Fabrics).

In an embodiment, at least one of the plurality of application servers 2100_1 to 2100_n may be configured to access at least one of the remaining application servers or at least one of the plurality of storage servers 2200_1 to 2200_m over the network NT.

For example, the first application server 2100_1 may store data requested by a user or a client in at least one of the plurality of storage servers 2200_1 to 2200_m over the network NT. Alternatively, the first application server 2100_1 may obtain data requested by the user or the client from at least one of the plurality of storage servers 2200_1 to 2200_m over the network NT. In this case, the first application server 2100_1 may be implemented with a web server, a database management system (DBMS), or the like.

That is, a processor 2110_1 of the first application server 2100_1 may access a memory (e.g., 2120_n) or a storage device (e.g., 2150_n) of another application server (e.g., 2100_n) over the network NT. Alternatively, the processor 2110_1 of the first application server 2100_1 may access the memory 2220_1 or the storage device 2250_1 of the first storage server 2200_1 over the network NT. As such, the first application server 2100_1 may perform various operations on data stored in the remaining application servers 2100_2 to 2100_n or the plurality of storage servers 2200_1 to 2200_m. For example, the first application server 2100_1 may execute or issue an instruction for moving or copying data between the remaining application servers 2100_2 to 2100_n or between the plurality of storage servers 2200_1 to 2200_m. In this case, data targeted for movement or copy may be moved from the storage devices 2250_1 to 2250_m of the storage servers 2200_1 to 2200_m to the memories 2120_1 to 2120_n of the application servers 2100_1 to 2100_n through the memories 2220_1 to 2220_m of the storage servers 2200_1 to 2200_m or directly. Data transferred over the network NT may be data that are encrypted for security or privacy.

In an embodiment, the storage servers 2200_1 to 2200_m may be storage servers described with reference to FIGS. 1 to 24, and the storage devices 2250_1 to 2250_m included in the storage servers 2200_1 to 2200_m may be storage devices described with reference to FIGS. 1 to 24. That is, the storage servers 2200_1 to 2200_m or the storage devices 2250_1 to 2250_m of the data center 2000 illustrated in FIG. 25 may be configured to support the write operation, the read operation, and the delete operation described with reference to FIGS. 1 to 23.

According to the present disclosure, a storage device supporting a data deduplication function having improved performance with reduced costs, an operation method of the storage device, and an operation method of a storage server are provided.

While the present disclosure has been described with reference to embodiments thereof, it will be apparent to those of ordinary skill in the art that various changes and modifications may be made thereto without departing from the spirit and scope of the present disclosure.

What is claimed is:

1. An operation method of a storage device, the method comprising:
   receiving a write request including an object identifier and data from an external device;
   performing a hash operation on the data to generate a hash value;
   determining whether an entry associated with the hash value is empty in a table;
   storing the data in an area of the storage device corresponding to a physical address and updating the entry to include the physical address and a reference count, when it is determined that the entry is empty; and
   increasing the reference count included in the entry without performing a store operation associated with the data, when it is determined that the entry is not empty,
   wherein an error message is returned to the external device when the entry associated with the hash value is not present in the table, and
   wherein the storage device does not perform a mapping operation between logical addresses and physical address.

2. The method of claim 1, wherein the write request further includes a second hash value of the data, the method further comprising:
sending an error message to the external device when the hash value does not match the second hash value.

3. The method of claim 1, further comprising:
receiving a read request including the object identifier and the hash value from the external device;
reading the data based on the physical address of the entry corresponding to the hash value;
performing a hash operation on the data to generate a second hash value; and
transmitting the data to the external device when the hash value and the second hash value match.

4. The method of claim 3, further comprising: after receiving the read request, sending an error message to the external device when it is determined that the table does not include an entry corresponding to the hash value.

5. The method of claim 1, further comprising:
receiving a delete request including the object identifier and the hash value from the external device; and
decreasing the reference count of the entry corresponding to the hash value.

6. The method of claim 5, further comprising selecting the data stored in the area corresponding to the physical address of the entry as invalid data in a garbage collection operation when the reference count of the entry has been decreased to 0.

7. The method of claim 1, wherein the reference count indicates a number of objects referencing the data.

8. The method of claim 1, further comprising:
receiving a second write request including the object identifier, the data, and a flag from the external device;
performing the hash operation on the data of the second write request to generate a second hash value the same as the hash value; and
storing the data in the second write request in an area corresponding to a second physical address and adding a second entry to the table including the second hash value and the second physical address, when the flag is set.

9. An operation method of a storage server including a plurality of storage devices and a storage node configured to manage the plurality of storage devices, the method comprising:
receiving, at the storage node, a first write request including a first object identifier and first data from an external client server;
performing, at the storage node, a hash operation on the first data to generate a first hash value;
determining, at the storage node, a first hash range, in which the first hash value is included, from among a plurality of hash ranges respectively assigned to the plurality of storage devices;
transmitting, at the storage node, a second write request including the first object identifier, the first data, and the first hash value to a first storage device corresponding to the first hash range from among the plurality of storage devices;
performing, at the first storage device, the hash operation on the first data included in the second write request to generate a second hash value;
storing, at the storage device, the first data in an area corresponding to a first physical address and updating a first entry to include the first physical address and a first reference count when the first and second hash values match and the first entry is empty in a first table;
increasing, at the first storage device, the first reference count of the first entry corresponding to the first hash value when the first and second hash values match and the first entry is present in the first table, without the storing of the first data; and
transmitting, at the first storage device, a completion response to the storage node,
wherein the storage device does not perform a mapping operation between logical addresses and physical addresses.

10. The operation method of claim 9, further comprising: updating, at the storage node, a second table based on the first object identifier and the first hash value.

11. The operation method of claim 10, wherein each entry of the first table includes information about a hash value of data, a physical address of the data, and a reference count of the data, and wherein each entry of the second table includes information about a plurality of object identifiers and a plurality of hash values respectively corresponding to the plurality of object identifiers.

12. The method of claim 11, further comprising:
receiving, at the storage node, a first read request including the first object identifier from the external client server;
detecting, at the storage node, the first hash value corresponding to the first object identifier based on the second table;
transmitting, at the storage node, a second read request including the first object identifier and the first hash value to the first storage device;
reading, at the first storage device, the first data based on a first physical address of the first entry corresponding to the first hash value;
transmitting, at the first storage device, the first data to the storage node; and
transmitting, at the storage node, the first data to the external client server.

13. The method of claim 9, further comprising:
transmitting, at the first storage device, error information to the storage node when the first and second hash values do not match.

14. The method of claim 13, further comprising:
performing, at the storage node, the hash operation again on the first data to re-generate the first hash value; and
transmitting a third write request to the first storage device including the re-generated first hash value.

15. The method of claim 9, further comprising:
receiving, at the storage node, device size information from the plurality of storage devices, respectively; and
assigning, at the storage node, the plurality of hash ranges to the plurality of storage devices, respectively, based on the device size information from the plurality of storage devices, wherein the plurality of hash ranges do not overlap each other.

16. The method of claim 15, further comprising: returning, at the storage node, an error message to the external device in response to that the first hash value is not included in the plurality of hash ranges.

17. The method of claim 9, further comprising: when a size of the first data received from the external client server is larger than a reference size, splitting, at the storage node, the first data into units of the reference size, when a size of the first data received from the external client server is larger than a reference size.

18. A storage device comprising:
a nonvolatile memory; and a storage controller configured to control the nonvolatile memory, wherein the storage controller comprises:
- a memory configured to store a first table;
- a hash module configured to perform a hash operation on first data received from an external device to generate a first hash value; and
- a deduplication manager configured to search the first table for a first entry corresponding to the first hash value and to selectively store the first data in the nonvolatile memory based on a search result of the search, wherein, when the first entry is present in the first table, the deduplication manager increases a first reference count of the first entry without storing the first data in the nonvolatile memory, and wherein, when the first entry is absent from the first table, the deduplication manager is configured to store the first data in an area corresponding to a first physical address of the nonvolatile memory and to add the first entry including the first hash value, the first physical address, and the first reference count to the first table.

19. The storage device of claim 18, wherein the storage controller further comprises:
a memory interface circuit configured to communicate with the nonvolatile memory, and wherein, when the first entry is present in the first table, the first data is not transmitted to the nonvolatile memory through the memory interface circuit.

20. The storage device of claim 18, wherein the storage controller further comprises:
a flash translation layer configured to perform a garbage collection operation on the nonvolatile memory, and wherein, in the garbage collection operation, the flash translation layer determines, as invalid data, data stored at a physical address corresponding to a reference count having a value of 0 from among a plurality of reference counts included in the first table.

* * * * *